US012665682B2

(12) United States Patent
Raghavan et al.

(10) Patent No.: US 12,665,682 B2
(45) Date of Patent: Jun. 23, 2026

(54) CALIBRATION OF NON-CO-LOCATED POLARIZED ANTENNA ARRAYS

(71) Applicant: QUALCOMM Incorporated, San Diego, CA (US)

(72) Inventors: Vasanthan Raghavan, West Windsor Township, NJ (US); Kobi Ravid, Closter, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 18/341,526

(22) Filed: Jun. 26, 2023

(65) Prior Publication Data

US 2024/0430017 A1     Dec. 26, 2024

(51) Int. Cl.
| | |
|---|---|
| *H04B 17/00* | (2015.01) |
| *H01Q 21/24* | (2006.01) |
| *H04B 17/11* | (2015.01) |
| *H04B 17/309* | (2015.01) |

(52) U.S. Cl.
CPC .............. *H04B 17/11* (2015.01); *H01Q 21/24* (2013.01); *H04B 17/309* (2015.01)

(58) Field of Classification Search
CPC ..... H02M 3/1584; H04B 17/11; H04B 7/309; H01Q 21/24
See application file for complete search history.

(56) References Cited

U.S. PATENT DOCUMENTS

| | | | | |
|---|---|---|---|---|
| 2007/0205955 A1* | 9/2007 | Korisch | ................. | H01Q 21/24 |
| | | | | 343/797 |
| 2021/0076370 A1* | 3/2021 | Bengtsson | ............ | H04W 72/23 |
| 2023/0327783 A1* | 10/2023 | Li | ............................ | H04B 7/02 |
| | | | | 455/67.11 |
| 2024/0204836 A1* | 6/2024 | Raghavan | ............ | H04B 7/0634 |

FOREIGN PATENT DOCUMENTS

WO     WO-2022043730 A1 *     3/2022     ............. H04B 17/12

OTHER PUBLICATIONS

International Search Report and Written Opinion—PCT/US2024/026792—ISA/EPO—Jul. 25, 2024.
MCC Support: "Draft Report of 3GPP TSG RAN WG1 #87 v0. 1.0 (Reno, USA, Nov. 14-18, 2016)", 3GPP TSG RAN WG1 Meeting #88, R1-17xxxxx, 3rd Generation Partnership Project, Mobile Competence Centre, 650, Route Des Lucioles, F-06921 Sophia-Antipolis Cedex, France, vol. RAN WG1, No. Athens, Greece, Feb. 13, 2017-Feb. 17, 2017, Dec. 2, 2016, pp. 1-157, XP051191687, R1-1613542 WF on Beam Correspondence, p. 111.

* cited by examiner

*Primary Examiner* — Ping Y Hsieh
(74) *Attorney, Agent, or Firm* — Harrity & Harrity LLP

(57)     ABSTRACT

Various aspects of the present disclosure generally relate to wireless communication. In some aspects, a first wireless communication device may transmit, to a second wireless communication device, capability information including an indication of a type of calibration associated with a non-co-located dual-polarized antenna array of the first wireless communication device. The first wireless communication device may communicate, using the non-co-located dual polarized antenna array, based at least in part on the calibration associated with the non-co-located dual polarized antenna array. Numerous other aspects are described.

30 Claims, 14 Drawing Sheets

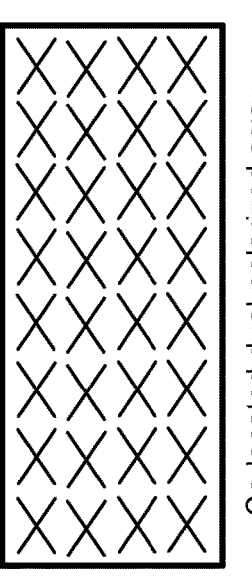
Co-located dual-polarized array
500
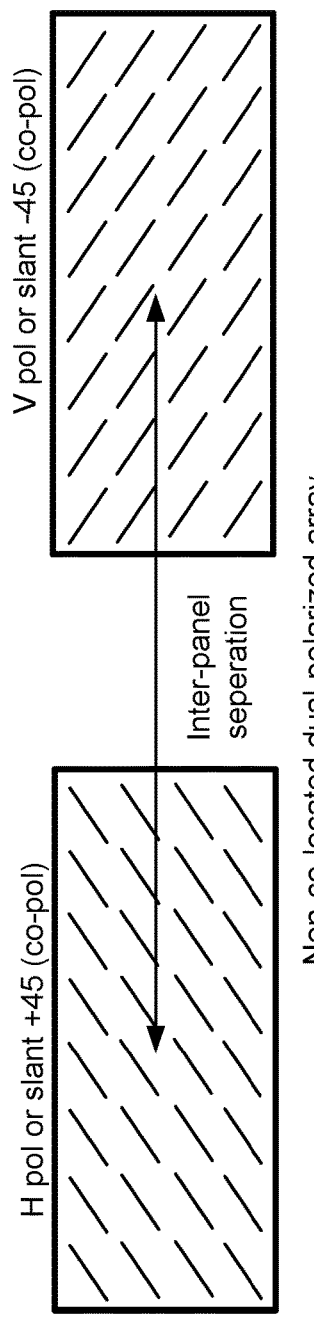
V pol or slant -45 (co-pol)
H pol or slant +45 (co-pol)
Inter-panel seperation
Non-co-located dual-polarized array
510
FIG. 5

710

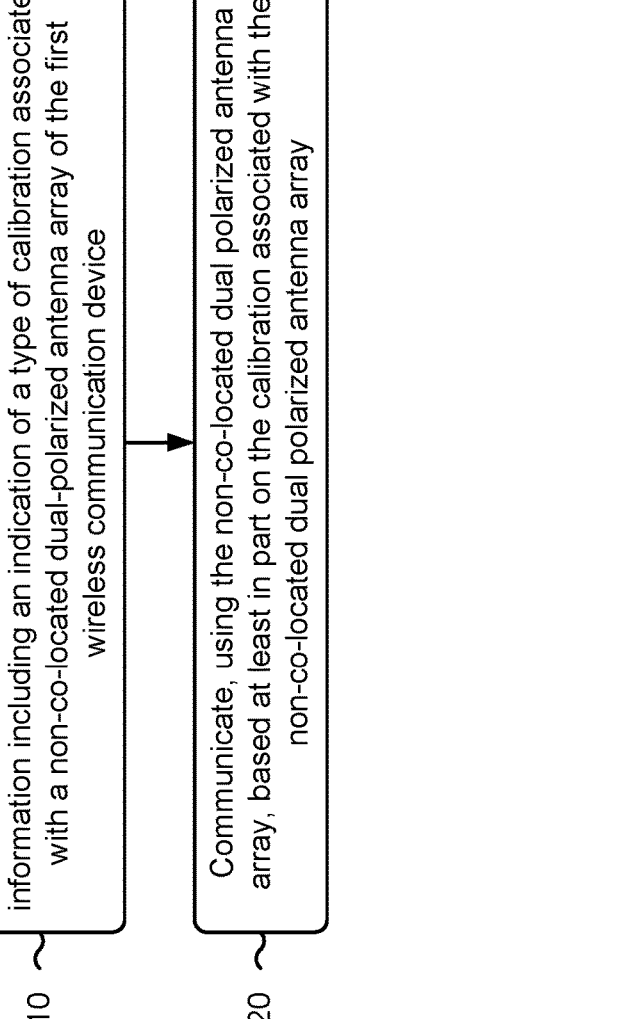

900

910 Transmit, to a second wireless communication device, capability information including an indication of a type of calibration associated with a non-co-located dual-polarized antenna array of the first wireless communication device 920 Communicate, using the non-co-located dual polarized antenna array, based at least in part on the calibration associated with the non-co-located dual polarized antenna array

FIG. 9

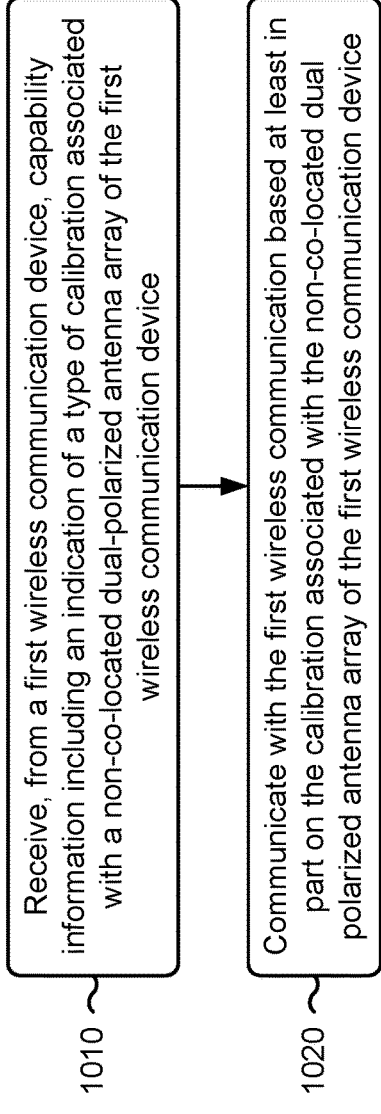

1010 Receive, from a first wireless communication device, capability information including an indication of a type of calibration associated with a non-co-located dual-polarized antenna array of the first wireless communication device 1020 Communicate with the first wireless communication based at least in part on the calibration associated with the non-co-located dual polarized antenna array of the first wireless communication device

Reception Component 1102

Communication Manager 1106

Transmission Component 1104

1108

CALIBRATION OF NON-CO-LOCATED POLARIZED ANTENNA ARRAYS

FIELD OF THE DISCLOSURE

Aspects of the present disclosure generally relate to wireless communication and to techniques and apparatuses for calibration of non-co-located polarized antenna arrays used for beamforming.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating examples of dual-polarized antenna arrays, in accordance with the present disclosure.

FIG. 9 is a diagram illustrating an example process performed, for example, by a first wireless communication device, in accordance with the present disclosure.

FIG. 10 is a diagram illustrating an example process performed, for example, by a second wireless communication device, in accordance with the present disclosure.

SUMMARY

Figure 1:
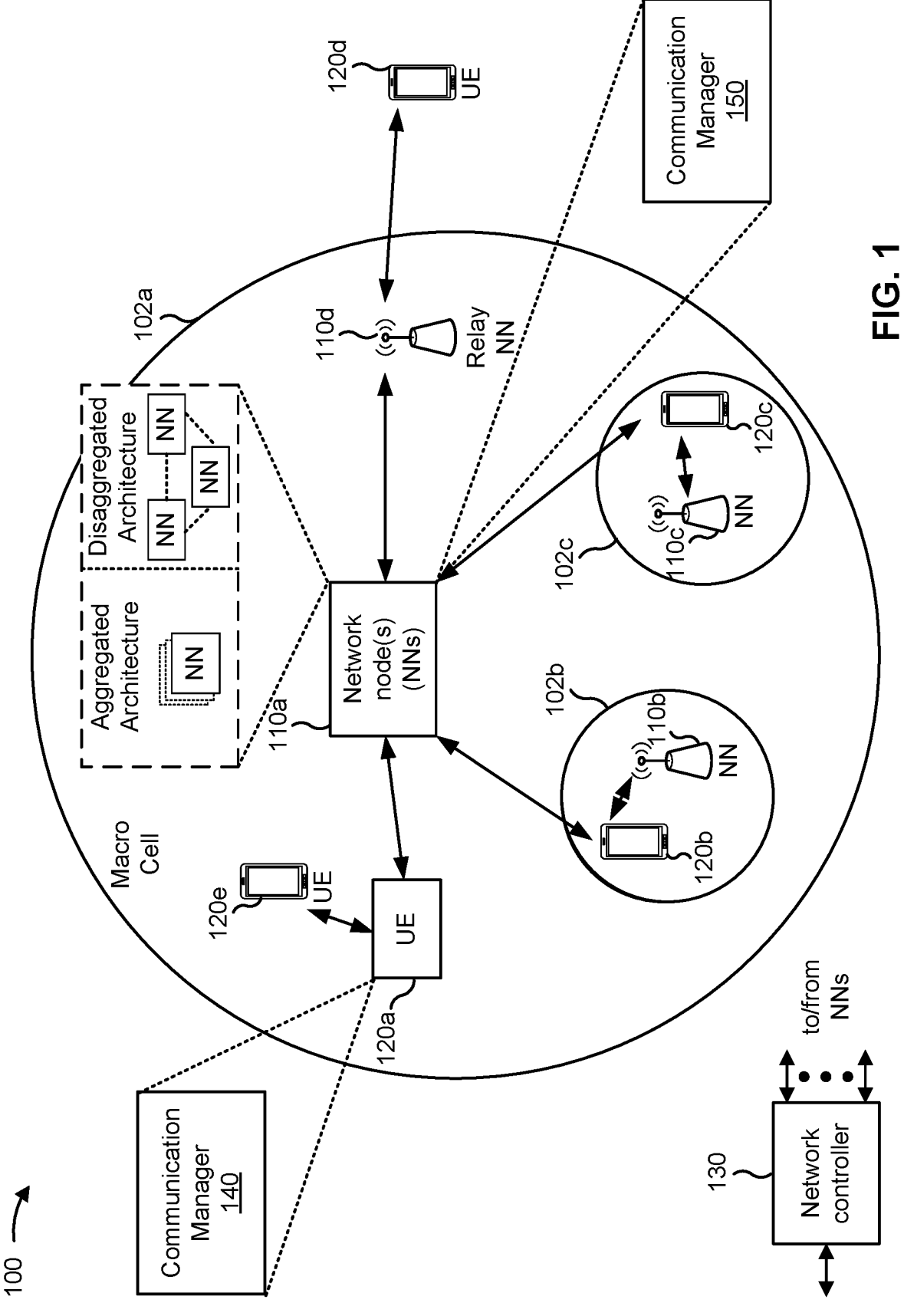
FIG. 1 is a diagram illustrating an example of a wireless network, in accordance with the present disclosure.

Some aspects described herein relate to a first wireless communication device for wireless communication. The first wireless communication device may include one or more memories and one or more processors coupled to the one or more memories. The one or more processors may be configured to transmit, to a second wireless communication device, capability information including an indication of a type of calibration associated with a non-co-located dual-polarized antenna array of the first wireless communication device. The one or more processors may be configured to communicate, using the non-co-located dual polarized antenna array, based at least in part on the calibration associated with the non-co-located dual polarized antenna array.

Some aspects described herein relate to a second wireless communication device for wireless communication. The second wireless communication device may include one or more memories and one or more processors coupled to the one or more memories. The one or more processors may be configured to receive, from a first wireless communication device, capability information including an indication of a type of calibration associated with a non-co-located dual-polarized antenna array of the first wireless communication device. The one or more processors may be configured to communicate with the first wireless communication based at least in part on the calibration associated with the non-co-located dual polarized antenna array of the first wireless communication device.

Some aspects described herein relate to a method of wireless communication performed by a first wireless communication device. The method may include transmitting, to a second wireless communication device, capability information including an indication of a type of calibration associated with a non-co-located dual-polarized antenna array of the first wireless communication device. The method may include communicating, using the non-co-located dual polarized antenna array, based at least in part on the calibration associated with the non-co-located dual polarized antenna array.

Some aspects described herein relate to a method of wireless communication performed by a second wireless communication device. The method may include receiving, from a first wireless communication device, capability information including an indication of a type of calibration associated with a non-co-located dual-polarized antenna array of the first wireless communication device. The method may include communicating with the first wireless communication based at least in part on the calibration associated with the non-co-located dual polarized antenna array of the first wireless communication device.

Some aspects described herein relate to a non-transitory computer-readable medium that stores a set of instructions for wireless communication by a first wireless communication device. The set of instructions, when executed by one or more processors of the first wireless communication device, may cause the first wireless communication device to transmit, to a second wireless communication device, capability information including an indication of a type of calibration associated with a non-co-located dual-polarized antenna array of the first wireless communication device. The set of instructions, when executed by one or more processors of the first wireless communication device, may cause the first wireless communication device to communicate, using the non-co-located dual polarized antenna array, based at least in part on the calibration associated with the non-co-located dual polarized antenna array.

Some aspects described herein relate to a non-transitory computer-readable medium that stores a set of instructions for wireless communication by a second wireless communication device. The set of instructions, when executed by one or more processors of the second wireless communication device, may cause the second wireless communication device to receive, from a first wireless communication device, capability information including an indication of a type of calibration associated with a non-co-located dual-polarized antenna array of the first wireless communication device. The set of instructions, when executed by one or more processors of the second wireless communication device, may cause the second wireless communication device to communicate with the first wireless communication based at least in part on the calibration associated with the non-co-located dual polarized antenna array of the first wireless communication device.

Some aspects described herein relate to an apparatus for wireless communication. The apparatus may include means for transmitting, to a wireless communication device, capability information including an indication of a type of calibration associated with a non-co-located dual-polarized antenna array of the apparatus. The apparatus may include means for communicating, using the non-co-located dual polarized antenna array, based at least in part on the calibration associated with the non-co-located dual polarized antenna array.

Some aspects described herein relate to an apparatus for wireless communication. The apparatus may include means for receiving, from a wireless communication device, capability information including an indication of a type of calibration associated with a non-co-located dual-polarized antenna array of the wireless communication device. The apparatus may include means for communicating with the wireless communication based at least in part on the calibration associated with the non-co-located dual polarized antenna array of the wireless communication device.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

In some examples, as the use of higher frequency bands increases, large dual-polarized antenna arrays may be deployed at wireless communications devices. Currently, co-located dual-polarized antenna arrays are typically used for communications in such higher frequency bands. However, as array sizes become larger (e.g., more antenna elements are used), non-co-located antenna arrays may become more prominent in deployments. A non-co-located dual-polarized antenna array includes two non-co-located polarized arrays on their own/individual respective antenna panels separated by an inter-panel separation. Each of the two polarized arrays includes an array of polarized antenna elements having a different polarization from the antenna elements of the other polarized array. In some examples, non-co-located dual-polarized antenna arrays may allow for better thermal management and/or a hardware design that reduces feedline crossings, as compared with co-located dual-polarized antenna arrays, particularly for large array sizes. As feedline crossings increase, so does the interference and the performance reliability drops. However, in some cases, calibration of non-co-located dual-polarized antenna arrays may have an increased latency and/or power consumption, as compared with co-located dual-polarized antenna arrays.

Various aspects relate generally to wireless communication. Some aspects more specifically relate to calibration of non-co-located dual-polarized antenna arrays. In some examples, a first wireless communication device that includes a non-co-located dual-polarized antenna array may transmit, to a second wireless communication device, capability information that includes an indication of a type of calibration associated with the non-co-located dual-polarized antenna array of the first wireless communication device. The first wireless communication device and the second wireless communication device may communicate based at least in part on the calibration associated with the non-co-located dual-polarized antenna array of the first wireless communication device. In some examples, the capability information may indicate whether the calibration is an offline calibration that has previously been performed, an online calibration to be performed in mission-mode operations, or a mixed offline and online calibration. In some examples, the capability information may indicate whether the calibration is a separate calibration of polarized arrays of the non-co-located dual-polarized antenna array, a common calibration of the polarized arrays of the non-co-located dual-polarized antenna array, or a full-duplexed calibration of the non-co-located dual-polarized antenna array. In some examples, the second wireless communication device may transmit, to the first wireless communication device, calibration assistance information, and the first wireless communication device may perform at least a portion of the calibration based at least in part on the calibration assistance information.

Particular aspects of the subject matter described in this disclosure can be implemented to realize one or more of the following potential advantages. In some examples, by transmitting the capability information indicating the type of calibration associated with the non-co-located dual-polarized antenna array of the first wireless communication device, the described techniques can be used to enable online and/or mixed offline and online calibration of the non-co-located dual-polarized antenna array that can be performed incrementally and/or improved over time. As a result calibration accuracy may be improved for a non-co-located dual-polarized antenna array. In some examples, the described techniques can be used to enable on-demand calibration of the non-co-located dual-polarized antenna array in connection with uplink-downlink beam correspondences for particular beam directions. As a result, calibration latency and/or power consumption may be reduced.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a wireless communication device, capability information including an indication of a type of calibration associated with a non-co-located dual-polarized antenna array; and communicate, using the non-co-located dual polarized antenna array, based at least in part on the calibration associated with the non-co-located dual polarized antenna array. Additionally, or alternatively, the communication manager 140 may receive, from a wireless communication device, capability information including an indication of a type of calibration associated with a non-co-located dual-polarized antenna array of the wireless communication device; and communicate with the wireless communication based at least in part on the calibration associated with the non-co-located dual polarized antenna array of the wireless communication device. Additionally, or alternatively, the communication manager 140 may perform one or more other operations described herein.

In some aspects, the network node 110 may include a communication manager 150. As described in more detail elsewhere herein, the communication manager 150 may receive, from a wireless communication device, capability information including an indication of a type of calibration associated with a non-co-located dual-polarized antenna array of the wireless communication device; and communicate with the wireless communication based at least in part on the calibration associated with the non-co-located dual polarized antenna array of the wireless communication device. Additionally, or alternatively, the communication manager 150 may transmit, to a wireless communication device, capability information including an indication of a type of calibration associated with a non-co-located dual-polarized antenna array; and communicate, using the non-co-located dual polarized antenna array, based at least in part on the calibration associated with the non-co-located dual polarized antenna array. Additionally, or alternatively, the communication manager 150 may perform one or more other operations described herein.

As indicated above, FIG. 1 is provided as an example. Other examples may differ from what is described with regard to FIG. 1.

Figure 2:
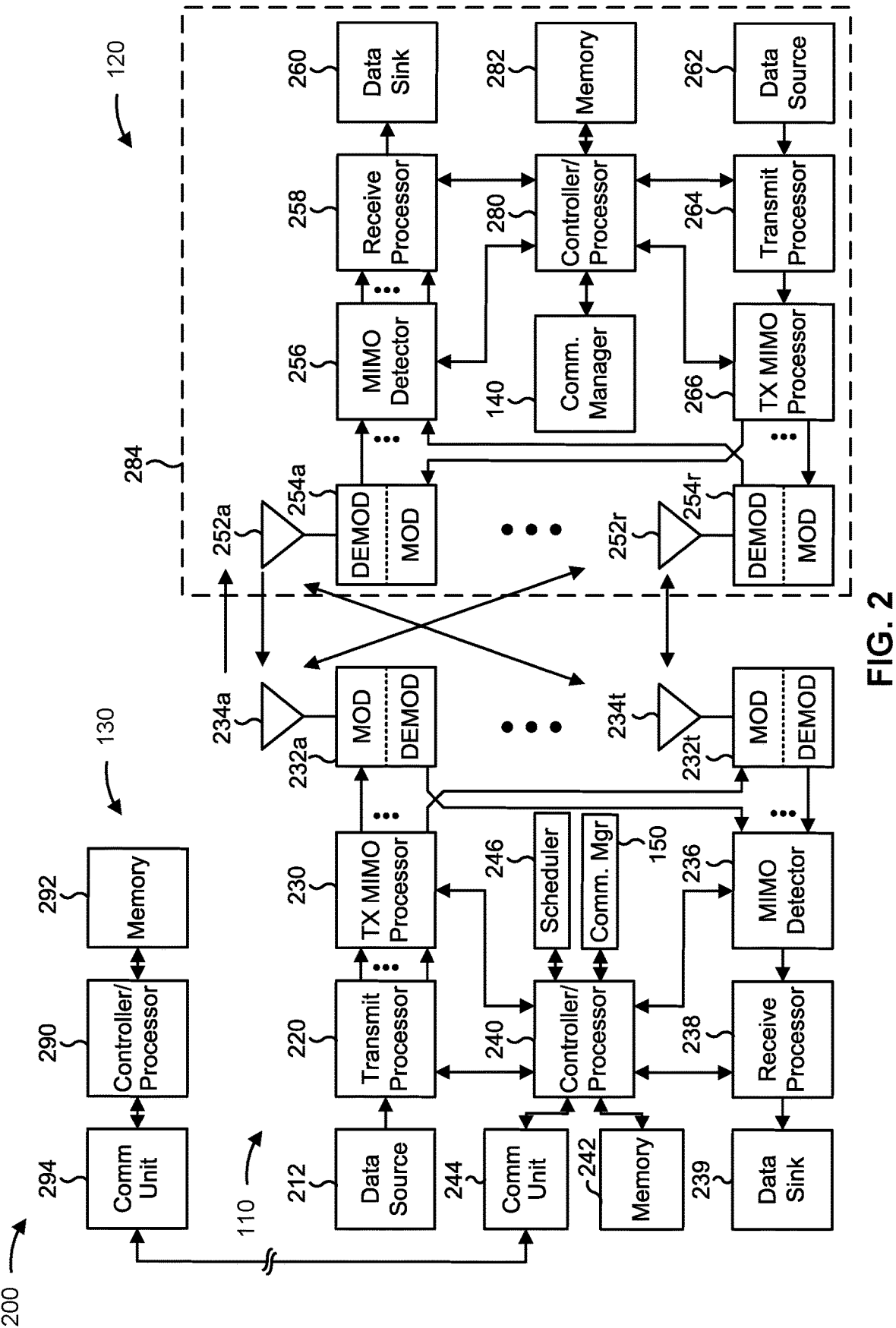
FIG. 2 is a diagram illustrating an example of a network node in communication with a user equipment in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the network node 110, the controller/processor 280 of the UE 120, and/or any other component(s) of FIG. 2 may perform one or more techniques associated with calibration of non-co-located polarized antenna arrays, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples. In some aspects, the first wireless communication device described herein is the UE 120, is included in the UE 120, or includes one or more components of the UE 120 shown in FIG. 2. In some aspects, the first wireless communication device described herein is the network node 110, is included in the network node 110, or includes one or more components of the network node 110 shown in FIG. 2. In some aspects, the second wireless communication device described herein is the network node 110, is included in the network node 110, or includes one or more components of the network node 110 shown in FIG. 2. In some aspects, the second wireless communication device described herein is the UE 120, is included in the UE 120, or includes one or more components of the UE 120 shown in FIG. 2.

In some aspects, a first wireless communication device (e.g., the UE 120 or the network node 110) includes means for transmitting, to a second wireless communication device, capability information including an indication of a type of calibration associated with a non-co-located dual-polarized antenna array of the first wireless communication device; and/or means for communicating, using the non-co-located dual polarized antenna array, based at least in part on the calibration associated with the non-co-located dual polarized antenna array. In some aspects, the means for the first wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282. In some aspects, the means for the first wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a second wireless communication device (e.g., the network node 110 or the UE 120) includes means for receiving, from a first wireless communication device, capability information including an indication of a type of calibration associated with a non-co-located dual-polarized antenna array of the first wireless communication device; and/or means for communicating with the first wireless communication based at least in part on the calibration associated with the non-co-located dual polarized antenna array of the first wireless communication device. In some aspects, the means for the second wireless communication device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the second wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. In some aspects, an individual memory may perform all of the functions described as being performed by the one or more memories. In some aspects, one or more memories may collectively perform a set of functions. For example, a first set of (one or more) memories of the one or more memories may perform a first function described as being performed by the one or more memories, and a second set of (one or more) memories of the one or more memories may perform a second function described as being performed by the one or more memories. The first set of memories and the second set of memories may be the same set of memories or may be different sets of memories. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
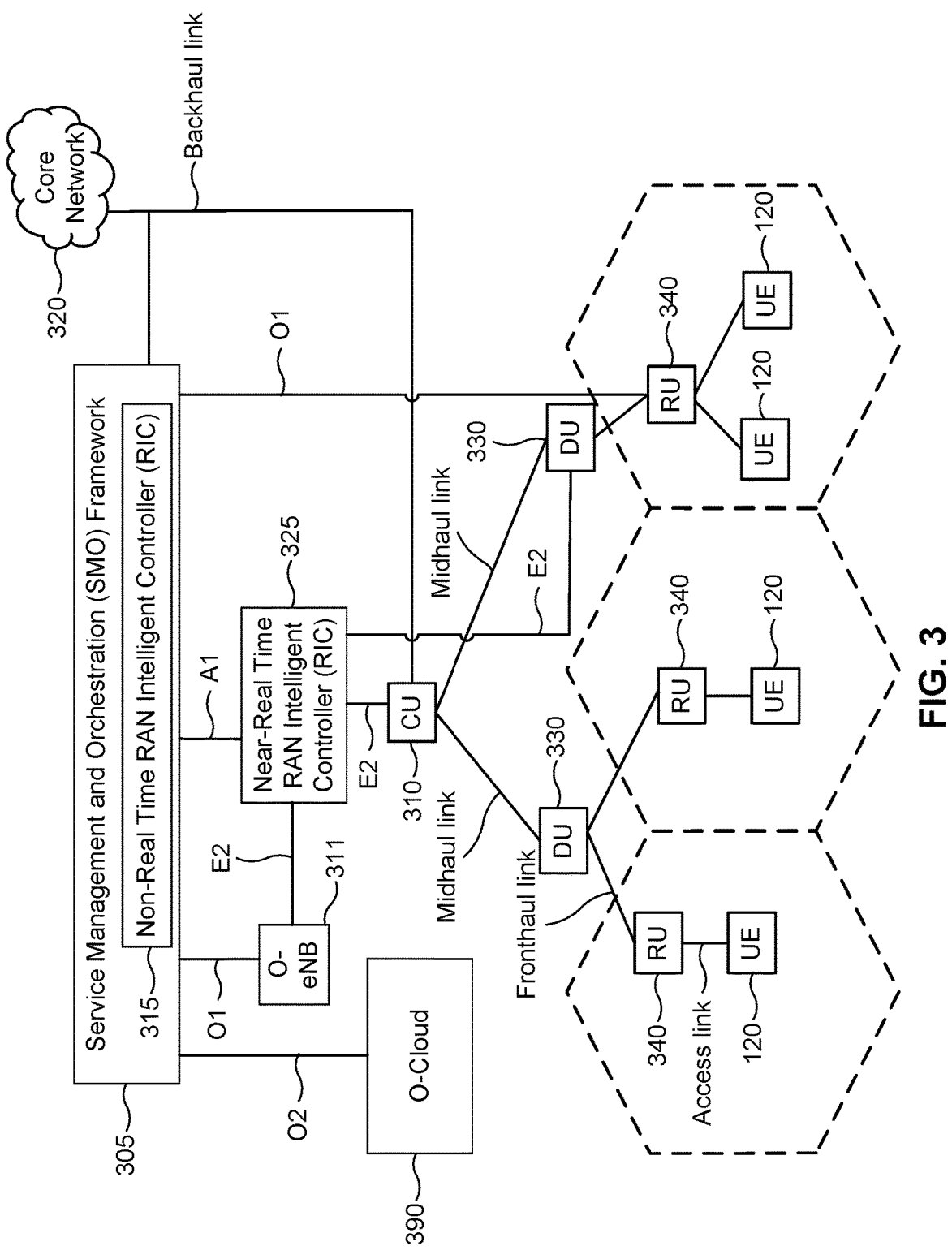
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
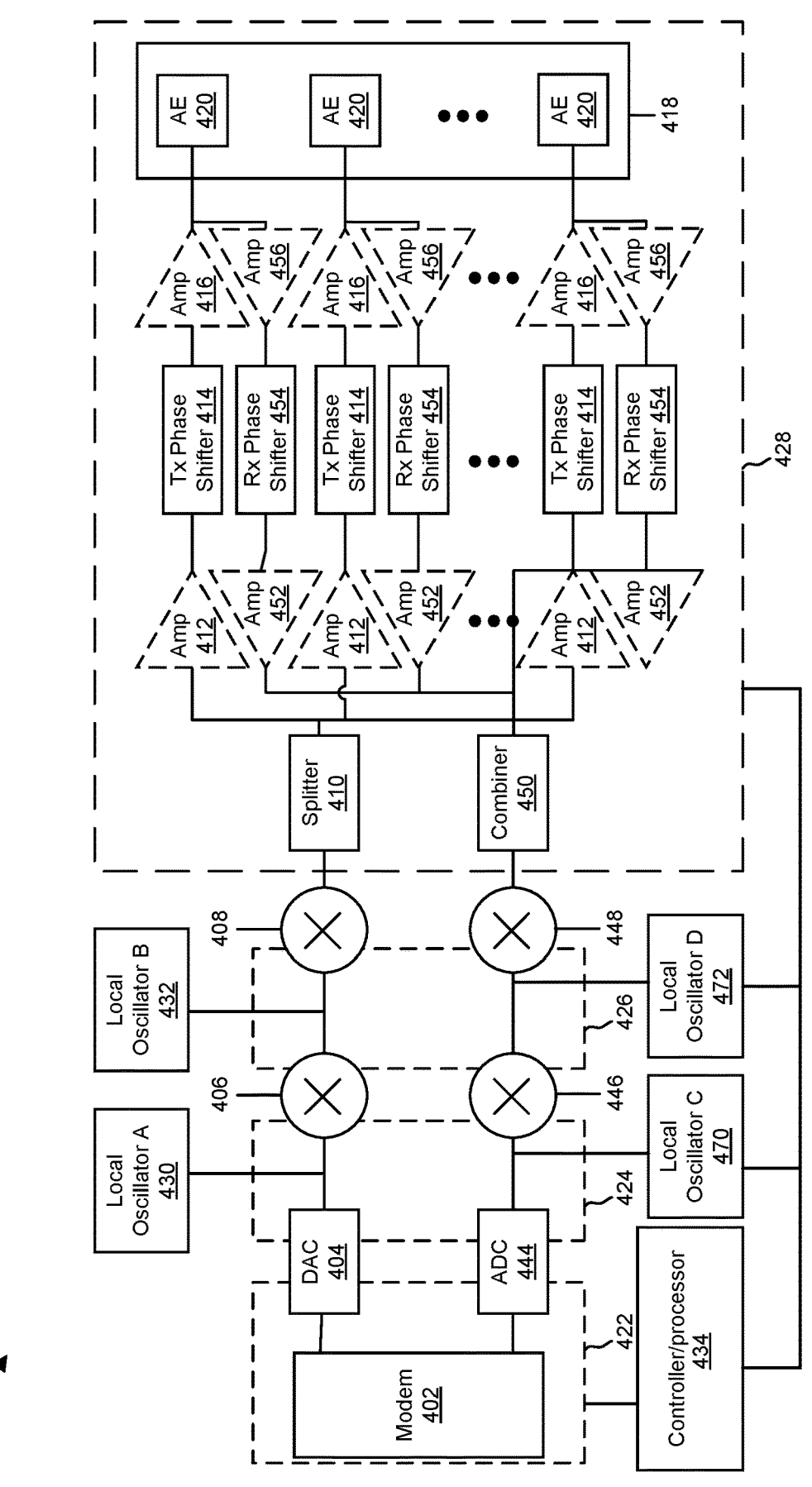
FIG. 4 is a diagram illustrating an example beamforming architecture that supports beamforming for millimeter wave communications, in accordance with the present disclosure.

FIG. 4 is a diagram illustrating an example beamforming architecture 400 that supports beamforming for millimeter wave (mmW) communications, in accordance with the present disclosure. In some aspects, architecture 400 may implement aspects of wireless network 100. In some aspects, architecture 400 may be implemented in a transmitting device (e.g., a first wireless communication device, UE, or network node) and/or a receiving device (e.g., a second wireless communication device, UE, or network node), as described herein.

Broadly, FIG. 4 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes multiple first amplifiers 412, multiple phase shifters 414, multiple second amplifiers 416, and an antenna array 418 that includes multiple antenna elements 420. In some examples, the modem 402 may be one or more of the modems 232 or modems 254 described in connection with FIG. 2.

Transmission lines or other waveguides, wires, and/or traces are shown connecting the various components to illustrate how signals to be transmitted may travel between components. Reference numbers 422, 424, 426, and 428 indicate regions in the architecture 400 in which different types of signals travel or are processed. Specifically, reference number 422 indicates a region in which digital baseband signals travel or are processed, reference number 424 indicates a region in which analog baseband signals travel or are processed, reference number 426 indicates a region in which analog intermediate frequency (IF) signals travel or are processed, and reference number 428 indicates a region in which analog RF signals travel or are processed. The architecture also includes a local oscillator A 430, a local oscillator B 432, and a controller/processor 434. In some aspects, controller/processor 434 corresponds to controller/processor 240 of the network node 110 described above in connection with FIG. 2 and/or controller/processor 280 of the UE 120 described above in connection with FIG. 2.

Each of the antenna elements 420 may include one or more sub-elements for radiating or receiving RF signals. For example, a single antenna element 420 may include a first sub-element cross-polarized with a second sub-element that can be used to independently transmit cross-polarized signals. The antenna elements 420 may include patch antennas, dipole antennas, or other types of antennas arranged in a linear pattern, a two dimensional pattern, or another pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similar to the first mixer, the second mixer 408 may mix the signals with an oscillating signal generated by the local oscillator B 432 to "move" the IF analog signals to the RF or the frequency at which signals will be transmitted or received. The modem 402 and/or the controller/processor 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into multiple identical or nearly identical RF signals. In other examples, the split may take place with any type of signal, including with baseband digital, baseband analog, or IF analog signals. Each of these signals may correspond to an antenna element 420, and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some aspects. In some aspects, both the first amplifier 412 and second amplifier 416 are present. In some aspects, neither the first amplifier 412 nor the second amplifier 416 is present. In some aspects, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used.

The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or the controller/processor 434) to provide independent control of the gain for each antenna element 420. For example, the modem 402 and/or the controller/processor 434 may have at least one control line connected to each of the splitter 410, first amplifiers 412, phase shifters 414, and/or second amplifiers 416 that may be used to configure a gain to provide a desired amount of gain for each component and thus each antenna element 420.

The phase shifter 414 may provide a configurable phase shift or phase offset to a corresponding RF signal to be transmitted. The phase shifter 414 may be a passive phase shifter not directly connected to a power supply. Passive phase shifters might introduce some insertion loss. The second amplifier 416 may boost the signal to compensate for the insertion loss. The phase shifter 414 may be an active phase shifter connected to a power supply such that the active phase shifter provides some amount of gain or prevents insertion loss. The settings of each of the phase shifters 414 are independent, meaning that each can be independently set to provide a desired amount of phase shift or the same amount of phase shift or some other configuration. The modem 402 and/or the controller/processor 434 may have at least one control line connected to each of the phase shifters 414 and which may be used to configure the phase shifters 414 to provide a desired amount of phase shift or phase offset between antenna elements 420.

In the illustrated architecture 400, RF signals received by the antenna elements 420 are provided to one or more first amplifiers 456 to boost the signal strength. The first amplifiers 456 may be connected to the same antenna arrays 418 (e.g., for time division duplex (TDD) operations). The first amplifiers 456 may be connected to different antenna arrays 418. The boosted RF signal is input into one or more phase shifters 454 to provide a configurable phase shift or phase offset for the corresponding received RF signal to enable reception via one or more Rx beams. The phase shifter 454 may be an active phase shifter or a passive phase shifter. The settings of the phase shifters 454 are independent, meaning that each can be independently set to provide a desired amount of phase shift or the same amount of phase shift or some other configuration. The modem 402 and/or the controller/processor 434 may have at least one control line connected to each of the phase shifters 454 and which may be used to configure the phase shifters 454 to provide a desired amount of phase shift or phase offset between antenna elements 420 to enable reception via one or more receive (Rx) beams.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signals input to combiner 450 have the same magnitude. The amplifiers 452 and/or 456 are illustrated in dashed lines because they might not be necessary in some aspects. In some aspects, both the amplifier 452 and the amplifier 456 are present. In another aspect, neither the amplifier 452 nor the amplifier 456 are present. In other aspects, one of the amplifiers 452, 456 is present but not the other.

In the illustrated architecture 400, signals output by the phase shifters 454 (via the amplifiers 452 when present) are combined in combiner 450. The combiner 450 in architecture 400 combines the RF signal into a signal. The combiner 450 may be a passive combiner (e.g., not connected to a power source), which may result in some insertion loss. The combiner 450 may be an active combiner (e.g., connected to a power source), which may result in some signal gain. When combiner 450 is an active combiner, it may provide a different (e.g., configurable) amount of gain for each input signal so that the input signals have the same magnitude when they are combined. When combiner 450 is an active combiner, the combiner 450 may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to digital signals. The digital signals output from ADC 444 are input to modem 402 for baseband processing, such as decoding, de-interleaving, or similar operations.

The architecture 400 is given by way of example only to illustrate an architecture for transmitting and/or receiving signals. In some cases, the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 422, 424, 426, 428) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In some aspects of this configuration, there may be multiple IF to RF mixers (e.g., for each antenna element chain) within the second mixer

408, and the local oscillator B 432 may supply different local oscillator signals (with different phase offsets) to each IF to RF mixer.

The modem 402 and/or the controller/processor 434 may control one or more of the other components 404 through 472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the multiple signals relative to each other. The controller/processor 434 may be located partially or fully within one or more other components of the architecture 400. For example, the controller/processor 434 may be located within the modem 402 in some aspects.

In some examples, such as for mmW communications, beamforming may be used to coherently combine energy and to overcome high path losses at higher frequencies. In such examples, beamforming weights, which control the relative weight of the signals transmitted using the different antenna elements, may be calculated for signaling. For a UE, beamforming weights may be calculated at the antennas in the Rx mode based on beam measurements. However, in some examples, the use of the same beamforming weights for transmit (Tx) beams transmitted from the UE may result in inaccurate beamforming because the RF pathways/circuitry are different in the Tx mode and the Rx mode (e.g., as shown in FIG. 4). Accordingly, in some examples, a calibration between the beams weights for Rx beams and the beams weights for Tx beams may be performed. The calibration may calibrate Rx and Tx beam weights used for the same beam directions. In some examples, the calibration may calibrate the Rx and Tx beams weights across different frequencies, temperature points, and/or amplitude levels, among other examples.

As indicated above, FIG. 4 is provided as an example. Other examples may differ from what is described with regard to FIG. 4.

FIG. 5 is a diagram illustrating examples 500 and 510 of dual-polarized antenna arrays, in accordance with the present disclosure.

Example 500 shows a co-located dual-polarized antenna array. A dual-polarized antenna array is an array of dual-polarized antenna elements (e.g., antenna elements that can transmit and/or receive over two polarizations). A dual-polarized antenna element may include a first sub-element cross-polarized with a second sub-element that can be used to independently transmit cross-polarized signals. As shown in example 500, each "X" indicates a dual polarized antenna element. In example 500, the dual-polarized antenna array is a co-located 8×4 dual-polarized array. In other examples, wireless communication devices may have different sized dual-polarized antenna arrays. A co-located dual-polarized antenna array is a single antenna array that includes both polarizations for each antenna element. That is, in a co-located dual-polarized antenna array, the cross-polarized sub-elements are co-located for each antenna element.

In some examples, as the use of higher frequency bands (e.g., FR2, FR4, and/or FR5, among other examples) increases, large dual-polarized antenna arrays (e.g., 32×4 or larger) may be deployed at wireless communications devices (e.g., network nodes and/or customer premises equipment (CPE), among other examples) for bridging the link budget at such higher frequencies. For example, dual-polarized patch antenna elements may be used for polarization MIMO gains in FR2, FR4, and/or FR5. Currently, in FR2, dual-polarized antenna arrays are typically co-located (e.g., as shown in example 500). However, as array sizes become larger (e.g., more antenna elements are used), non-co-located antenna arrays may become more prominent in deployments due to space issues, power consumption considerations, and avoiding signal routing complexities such as those associated with feedline crossings, among other examples.

Example 510 shows a non-co-located dual-polarized antenna array. As shown in example 510, the non-co-located dual-polarized antenna array includes two non-co-located polarized arrays (e.g., a first polarized array and a second polarized array). For example, the two polarized arrays may be two antenna panels separated by an inter-panel separation. Each of the two polarized arrays includes an array of polarized antenna elements, and the polarized antenna elements of the first polarized array have a different polarization then the polarized antenna elements of the second array. For example, each antenna element of the first polarized array may be cross-polarized with a corresponding antenna element of the second polarized array. As shown in example 510, each "/" in the first polarized indicates a polarized antenna element with a first polarization, and each "\" in the second polarized array indicates a polarized antenna element with a second polarization. For example, the first polarization may be an H polarization or a slant +45 (co-polarization), and the second polarization may be a V polarization or a slant −45 (cross-polarization). Corresponding pairs of antenna elements from the first polarized array and the second polarized array act as dual-polarized antenna elements of the non-co-located dual-polarized antenna array. In example 510, the non-co-located dual-polarized antenna array is a non-co-located 8×4 dual-polarized array (e.g., including two 8×4 polarized arrays). In other examples, wireless communication devices may have different sized non-co-located dual-polarized antenna arrays.

In some examples, non-co-located dual-polarized antenna arrays can allow better thermal management than co-located dual-polarized antenna arrays because the antenna elements with different polarizations are distinct (e.g., non-co-located) in the non-co-located dual-polarized antenna arrays. In some examples, as more antenna elements are used, feedline crossings may become more complicated and/or difficult to avoid in co-located dual-polarized antenna arrays. This makes hardware design difficult for large co-located dual-polarized antenna arrays and an increase in interference and a drop in signal quality. Furthermore, such feedline crossings may make impedance matching more difficult and result in reduced antenna efficiencies for large co-located dual-polarized antenna arrays. Non-co-located dual-polarized antenna arrays may allow for easier hardware designs that minimize and/or avoid feedline crossings, resulting in easier impedance matching and increased antenna efficiencies, as compared to co-located dual-polarized antenna arrays, particularly in the case of larger arrays. In some examples, non-co-located dual-polarized antenna arrays can be more uncorrelated than co-located dual-polarized antenna arrays, which may allow for spatial MIMO gains. However, in some cases, calibration of non-co-located dual-polarized antenna arrays may have an increased latency and/or power consumption, as compared with co-located dual-polarized antenna arrays.

As indicated above, FIG. 5 is provided as an example. Other examples may differ from what is described with respect to FIG. 5.

Figure 6:
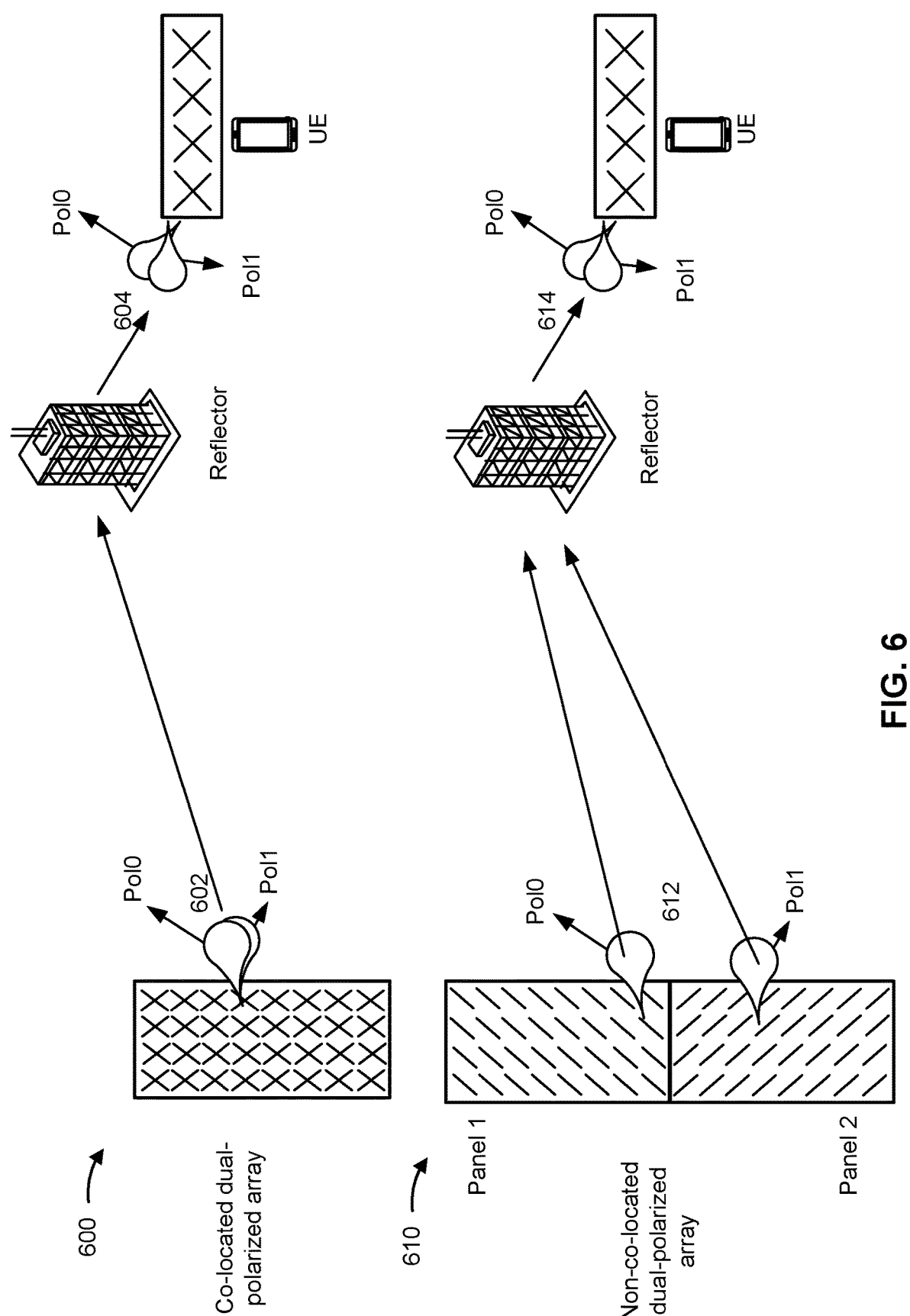
FIG. 6 is a diagram illustrating examples of dual-polarized antenna array transmissions, in accordance with the present disclosure.

FIG. 6 is a diagram illustrating examples 600 and 610 of dual-polarized antenna array transmissions, in accordance with the present disclosure.

Example 600 shows an example of a transmission from a co-located dual-polarized antenna array of a network node (e.g., network node 110). For example, the co-located dual-polarized antenna array of the network node may be an 8×4 dual-polarized antenna array (as shown in example 600) or another sized dual-polarized antenna array. As shown by reference number 602, the network node, using the co-located dual-polarized antenna array, may transmit signals over two polarizations (Pol0 and Pol1) along a same direction (e.g., on a same Tx beam). In some examples, the signals may be reflected by a reflector (e.g., a glass or a metallic component in a building or a vehicle and/or another reflector). As shown by reference number 604, a UE (e.g., UE 120) may receive the signals over both polarizations (e.g., Pol0 and Pol1) along the same direction (e.g., on a same Rx beam). For example, the UE may receive the signals over both polarizations using a dual-polarized antenna array of the UE (e.g., shown as a co-located 4×1 dual-polarized antenna array in example 600).

Example 610 shows an example of transmission from a non-co-located dual-polarized antenna array of a network node (e.g., network node 110). For example, the non-co-located dual-polarized antenna array of the network node may have an 8×4 non-co-located dual-polarized antenna array (as shown in example 610) or another sized non-co-located dual-polarized antenna array. The non-co-located dual-polarized antenna array may include multiple panels of uni-polarized arrays. For example, the non-co-located dual-polarized antenna array may include a first panel (Panel 1) including a first polarized array and a second panel (Panel 2) including a second polarized array. As shown by reference number 612, the network node may transmit a signal over a first polarization (Pol0) in a first direction (e.g., on a first Tx beam) from Panel 1 (e.g., from the first polarized array of the non-co-located dual-polarized antenna array) and a signal over a second polarization (Pol1) in a second direction (e.g., on a second Tx beam) from Panel 2 (e.g., from the second polarized array of the non-co-located dual-polarized antenna array). The relative angular differences between the first Tx beam and the second Tx beam may be minimal in far field operations. In some examples, the signals may be reflected by a reflector (e.g., a building and/or another reflector). As shown by reference number 614, a UE (e.g., UE 120) may receive the signals over both polarizations (e.g., Pol0 and Pol1) along the same direction (e.g., on a same Rx beam). For example, the UE may receive the signals over both polarizations using a dual-polarized antenna array of the UE (e.g., shown as a co-located 4×1 dual-polarized antenna array in example 610).

As indicated above, FIG. 6 is provided as an example. Other examples may differ from what is described with respect to FIG. 6.

Figure 7A:
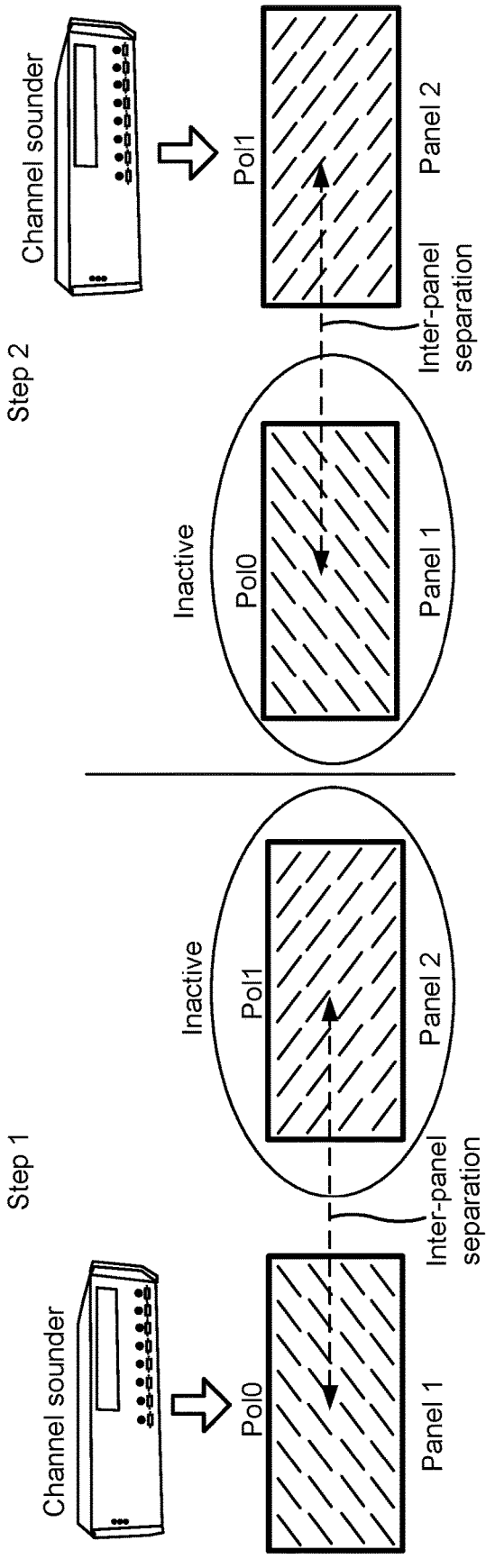
FIGS. 7A-7C are diagrams illustrating examples of non-co-located dual-polarized antenna array calibration, in accordance with the present disclosure.
Figure 7B:
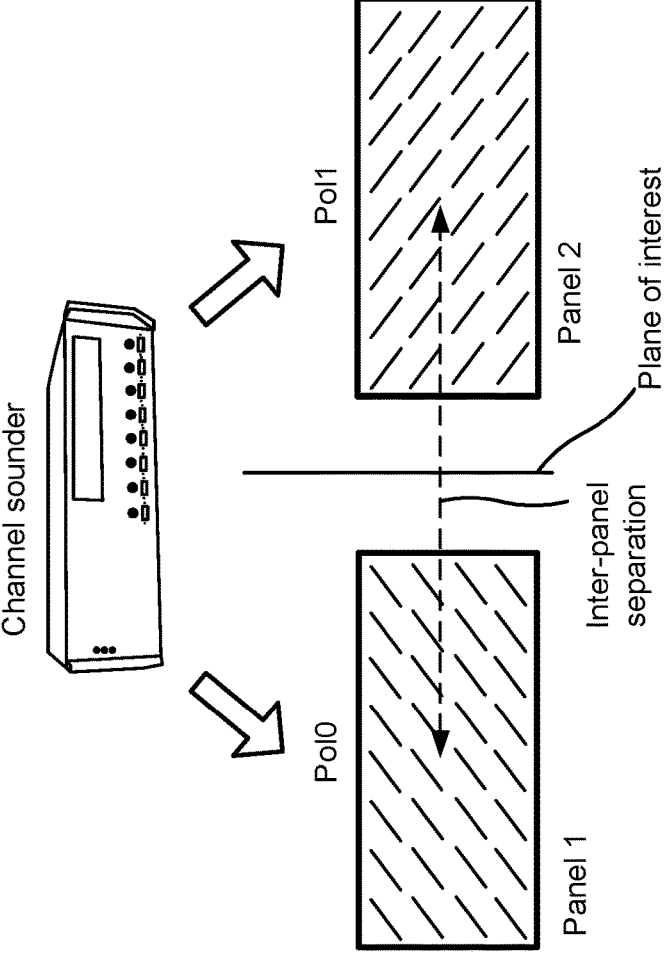
Figure 7C:
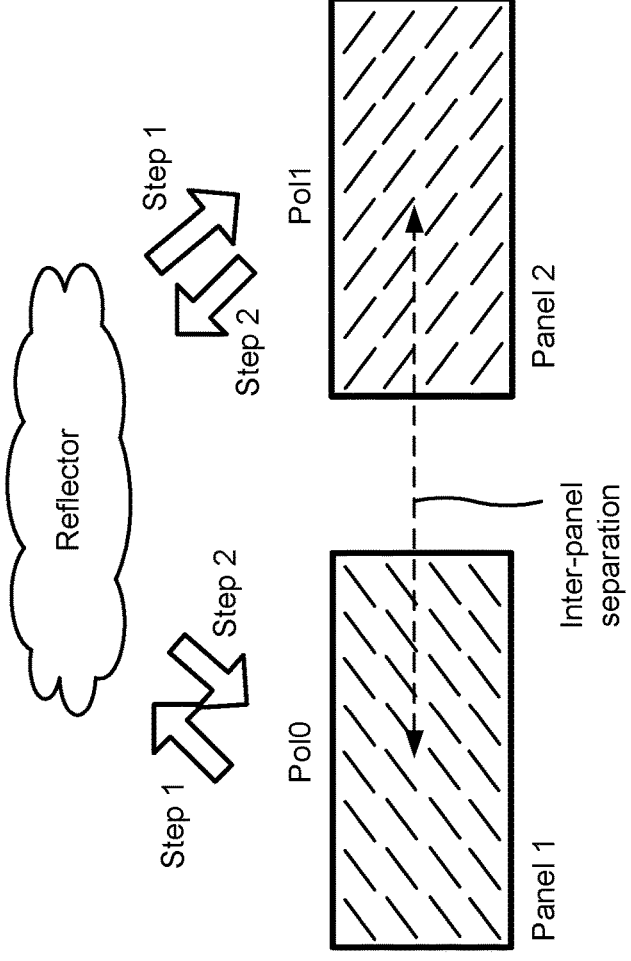

FIGS. 7A-7C are diagrams illustrating examples 700, 710, and 720 of non-co-located dual-polarized antenna array calibration, in accordance with the present disclosure.

As shown in FIGS. 7A-7C, a non-co-located dual-polarized antenna array may include a first antenna panel (Panel 1) including a first polarized array with antenna elements having a first polarization (Pol0) and a second antenna panel (Panel 2) including a second polarized array with antenna elements having a second polarization (Pol1). Panel 1 and Panel 2 may be separated by an inter-panel separation. In some examples, the inter-panel separation may be in one dimension (e.g., Panel 1 and Panel 2 may be horizontally or vertically aligned). In some other examples, the inter-panel separation may be in two-dimensions. In some examples, the first and second polarized arrays may not be symmetrically placed with respect to each other. In such examples, the inter-panel separation may be the distance between the respective centers of the first and second polarized arrays.

In some examples, the calibration of the non-co-located dual-polarized antenna array may be performed offline. Offline calibration (e.g., calibration in an offline mode) refers to calibration of the non-co-located dual-polarized antenna array prior to deployment of the non-co-located dual-polarized antenna array and/or the wireless communication device including the non-co-located dual-polarized antenna array in a wireless network. For example, offline calibration of the panels of the non-co-located dual-polarized antenna array may be performed by a manufacturer of a wireless communication device as a factory calibration procedure. Such an offline calibration procedure may be used to learn mismatches between Rx beam weights and Tx beam weights, generate a look-up table including the mismatches between the Rx beam weights and the Tx beam weights, and store the look-up table on the wireless communication device. In some other examples, the calibration of the non-co-located dual-polarized antenna array may be performed online in mission-mode operations. Online calibration (e.g., calibration in an online mode or in a deployed condition) may refer to calibration of the non-co-located dual-polarized antenna array in mission-mode operations while the wireless communication device including the non-co-located dual-polarized antenna array is deployed in a wireless network. In some examples, online calibration may include on-demand calibration of a non-co-located dual-polarized antenna array of a wireless communication device while the wireless communication device is operating in a mission-mode (e.g., while the wireless communication device is deployed in a wireless network). In some examples, the calibration of the non-co-located dual-polarized antenna array may be performed separately across the polarized arrays or in a common plane for both of the polarized arrays.

As shown in FIG. 7A, example 700 shows an example of separate calibration of the polarized arrays of the non-co-located dual-polarized antenna array. In a separate calibration procedure, each polarized array is calibrated separately using a channel sounder for far-field and/or near-field operations. The channel sounder may be any device capable of producing a waveform. For example, the channel sounder may be a MIMO channel sounder that enables channel measurements in both propagation directions. The channel sounder may be aligned to each of the polarized arrays for calibration of each polarized array based on far-field and/or near-field requirements. For example, as shown in FIG. 7A, in a first step (Step 1), the channel sounder may be aligned to Panel 1 for calibration of the first polarized array (Pol0) while Panel 2 is inactive. The Tx and Rx circuitry associated with the first polarized array (Pol0) may be calibrated (e.g., the Tx and Rx beam weights may be calibrated) based on channel sounding measurements performed in Step 1. In a second step (Step 2), the channel sounder may be aligned to Panel 2 for calibration of the second polarized array (Pol1) while Panel 1 is inactive. The Tx and Rx circuitry associated with the second polarized array (Pol1) may be calibrated (e.g., the Tx and Rx beam weights may be calibrated) based on channel sounding measurements performed in Step 2. In some examples, asymmetric array placements may be managed using the separate calibration of the polarized arrays shown in FIG. 7A.

As shown in FIG. 7B, example 710 shows an example of a common calibration of the polarized arrays of the non-co-located dual-polarized antenna array. As shown in example 710, in the common calibration of the polarized arrays, both polarized arrays may be simultaneously calibrated using a channel sounder. In some examples, the channel sounder may be aligned to a plane of interest associated with the polarized antenna arrays. For example, the channel sounder may be aligned to a mid-point between the two polarized arrays or any other chosen location (e.g., plane of interest) between the two polarized arrays. In the common calibration procedure, the channel sounder may produce waveforms that are used by both polarizations (Pol0 and Pol1) to calibrate the Rx and Tx beam weights for the first and second polarized arrays.

In some examples, the latency of the common calibration of the first and second polarized arrays of the non-co-located dual-polarized antenna array may be a function of the array dimensions, relative array orientations of the polarized arrays, a number of phase shifter and gain states, a number of frequency and/or temperature settings, and/or a required accuracy of the calibration (e.g., which determines performance loss with respect to optimal performance), among other examples. In some examples, the phase and gain settings from the common calibration of the first and second polarized arrays may be adjusted based at least in part on a look-up table. For example, the look-up table may indicate adjustments to the phase and gain settings based on the inter-panel separation and/or the angle of steered beam, among other examples.

In some examples, the separate calibration of the polarized arrays shown in FIG. 7A may have relatively better accuracy than the common calibration of the polarized arrays shown in FIG. 7B, and may be used to handle calibration of asymmetric array placements. In some examples, the common calibration of the polarized arrays shown in FIG. 7B may have a lower latency than the separate calibration of the polarized arrays shown in FIG. 7A.

As shown in FIG. 7C, example 720 shows an example of a full-duplexed calibration of the polarized arrays of the non-co-located dual-polarized antenna array. In the full-duplexed calibration, transmissions from one polarization may be received on the other polarization and used to perform calibration of the polarized array associated with the other polarization. For example, a reflector can change the polarization of the transmitted signal, and the signal strength can be measured by the array associated with the other polarization. As shown in FIG. 7C, in a first step (Step 1), the first polarized array (Pol0) may transmit one or more signals, the reflector may reflect the one or more signals and change the polarization of the one or more signals, and the second polarized array (Pol1) may receive the one or more signals. In a second step (Step 2), the second polarized array (Pol1) may transmit one or more signals, the reflector may reflect the one or more signals and change the polarization of the one or more signals, and the first polarized array (Pol) may receive the one or more signals. The signal strength measurements of the one or more signals received by the second polarized array in Step 1 and the signal strength measurements of the one or more signals received by the first polarized array in Step 2 may be used to calibrate the Tx and Rx beam weights of the first and second polarized arrays. The full-duplexed calibration does not require a channel sounder to produce waveforms for the calibration.

As indicated above, FIGS. 7A-7C are provided as examples. Other examples may differ from what is described with respect to FIGS. 7A-7C.

Figure 8:
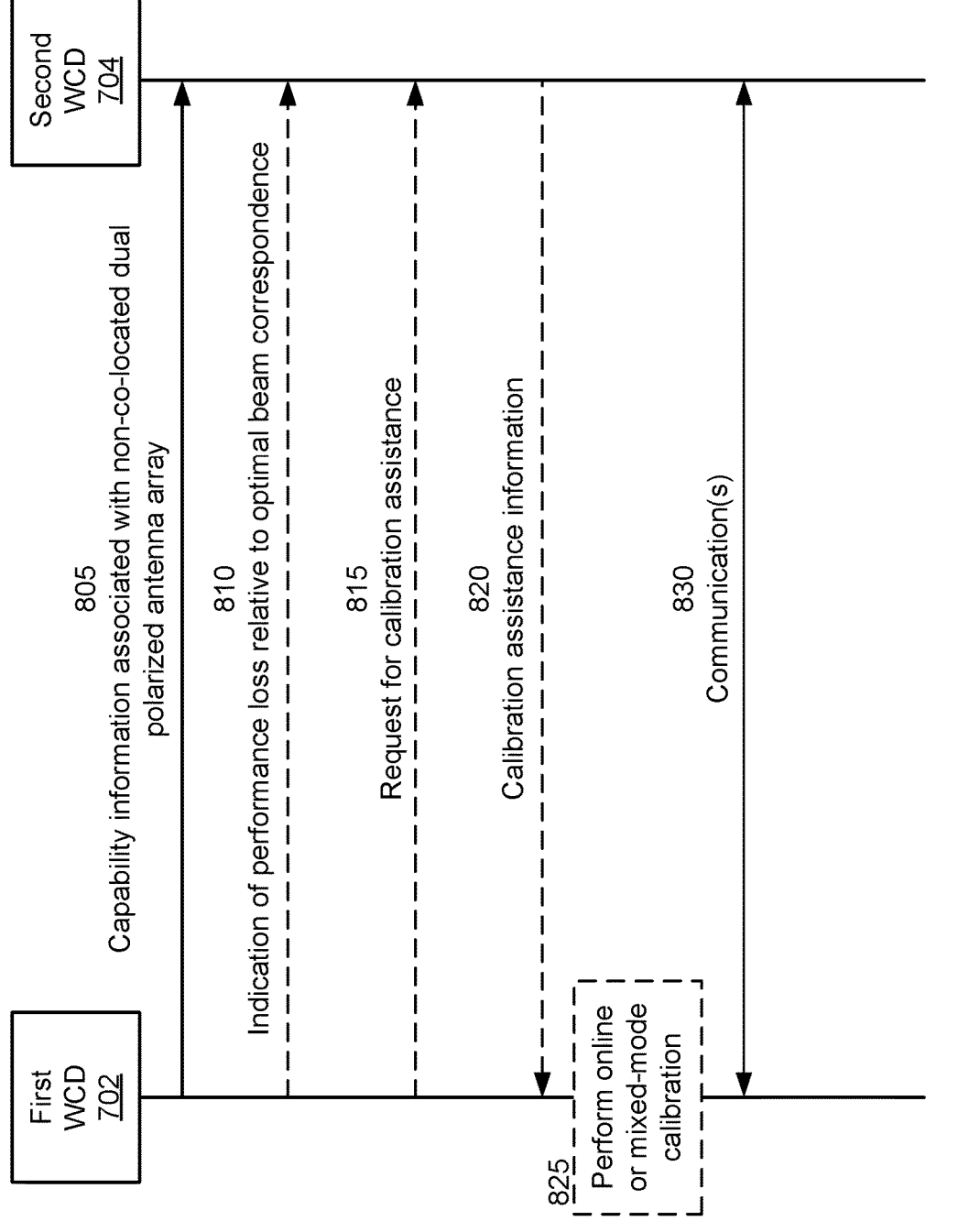
FIG. 8 is a diagram illustrating an example associated with calibration of non-co-located dual-polarized antenna arrays, in accordance with the present disclosure.

FIG. 8 is a diagram illustrating an example 800 associated with calibration of non-co-located dual-polarized antenna arrays, in accordance with the present disclosure. As shown in FIG. 8, example 800 includes communication between a first wireless communication device (WCD) 702 and a second WCD 704. In some aspects, the first WCD 702 and the second WCD 704 may be included in a wireless network, such as wireless network 100.

In some aspects, the first WCD 702 may be a UE (e.g., UE 120) and the second WCD 704 may be a network node (e.g., network node 110). In some other aspects, the first WCD 702 may be a first network node and the second WCD 704 may be a second network node. In some other aspects, the first WCD 702 may be a network node and the second WCD 704 may be a UE. In some other aspects, the first WCD 702 may be a first UE and the second WCD 704 may be a second UE.

As shown in FIG. 8, and by reference number 805, the first WCD 702 may transmit, and the second WCD 704 may receive, capability information associated with a non-co-located dual-polarized antenna array of the first WCD 702. In some aspects, the capability information may include an indication that the first WCD 702 includes a non-co-located dual-polarized antenna array. Additionally, or alternatively, the capability information may include an indication of a type of calibration associated with the non-co-located dual-polarized antenna array of the first WCD 702. For example, the capability information may indicate the type of calibration used or to be used for calibrating uplink-downlink (e.g., Tx-Rx) beam correspondence for the non-co-located dual-polarized antenna array of the first WCD 702.

In some aspects, the indication of the type of calibration may include an indication of a type of training period associated with the calibration. For example, the indication of the type of calibration may indicate that the calibration is an offline calibration (e.g., offline only calibration) that has already been performed, an online calibration (e.g., an online only calibration) to be performed in mission-mode operations, or mixed offline and online calibration (e.g., a mixed mode calibration where a subset of coefficients is calibrated offline and another subset is calibrated online). A mixed offline and online calibration may be a calibration that is partially performed offline (e.g., prior to mission-mode operations) but includes one or more online (e.g., mission-mode) operations. For example, a mixed offline and online calibration may include an initial calibration that is performed offline and that can be updated on an on-demand basis using online calibration operations (e.g., based at least in part on online measurements).

In some aspects, the indication of the type of calibration may indicate a type of calibration how the calibration is performed (or to be performed) across the polarized arrays of the non-co-located dual-polarized antenna array of the first WCD 702. For example, the indication of the type of calibration may indicate that the calibration is a separate calibration of the polarized arrays of the non-co-located dual-polarized antenna array (e.g., as discussed in connection with FIG. 7A), a common calibration of the polarized arrays of the non-co-located dual-polarized antenna array (e.g., as discussed in connection with FIG. 7B), or a full-duplexed calibration of the polarized arrays of the non-co-located dual-polarized antenna array (e.g., as discussed in connection with FIG. 7C). In some aspects, in the case of the common calibration of the polarized arrays, the indication of the type of calibration may indicate whether the calibration is a common calibration adjusted with a look-up table. In some aspects, other types of calibrations may be indicated in addition to or instead of the separate calibration, the common calibration, and/or the full-duplexed calibration described herein. In some aspects, the indication of the type of calibration may indicate that the calibration is a combination of two or more different calibration types (e.g., two or more of the separate calibration, the common calibration, and/or the full-duplexed calibration, among other examples). In some aspects, the indication of the type of calibration may indicate the type of training period associated with the calibration (e.g., offline, online, or mixed offline and online) and/or the indication of how the calibration is performed (or to be performed) across the polarized arrays (e.g., separate calibration, common calibration, or full-duplexed calibration, among other examples).

As further shown in FIG. 8, and by reference number 810, in some aspects, the first WCD 702 may transmit, and the second WCD 704 may receive, an indication of a performance loss relative to an optimal beam correspondence associated with the calibration of the non-co-located dual-polarized antenna array of the first WCD 702. For example, the indication of the performance loss may be an indication of a performance loss relative to an optimal beam correspondence to be achieved by calibration of the non-co-located dual-polarized antenna array using the indicated type of calibration. That is, the first WCD 702 may indicate an estimated performance loss for communications without calibration (or further calibration) of the Tx and Rx beams weights, relative to an optimal beam correspondence resulting from the calibration of the non-co-located dual-polarized antenna array using the type of beam calibration indicated in the capability information. For example, the indication of the performance loss relative to the optimal beam correspondence may provide, to the second WCD 704, an indication of the importance of performing online (or mixed-mode) calibration of the non-co-located dual-polarized antenna array.

In some aspects, the first WCD 702 may transmit the indication of the performance loss relative to the optimal beam correspondence to the second WCD 704 in a different communication from the capability information. In some aspects, the second WCD 704 may transmit the indication of the performance loss relative to the optimal beam correspondence to the second WCD 704 in the same communication as the capability information. In some aspects, the first WCD 702 may transmit the indication of the performance loss relative to the optimal beam correspondence to the second WCD 704 in a case in which the calibration is an online calibration to be performed in mission-mode operations or a mixed offline and online calibration. In some aspects, the first WCD 702 may transmit the indication of the performance loss relative to the optimal beam correspondence to the second WCD 704 based at least in part on the performance loss satisfying (e.g., being greater than or equal to) a threshold.

In some aspects, the first WCD 702 may not transmit the indication of the performance loss relative to the optimal beam correspondence. In some examples, the first WCD 702 may not transmit the indication of the performance loss relative to the optimal beam correspondence in a case in which the indication of the type of calibration indicates that the calibration is an offline calibration that has been previously performed.

As further shown in FIG. 8, and by reference number 815, in some aspects, the first WCD 702 may transmit, and the second WCD 704 may receive, a request for calibration assistance. For example, the request for calibration assistance may be a request for assistance for online or mixed-mode (e.g., mixed offline and online) calibration of the non-co-located dual-polarized antenna array of the first WCD 702. For example, the request for calibration assistance may be a request for assistance for on-demand and/or periodic calibration of the non-co-located dual-polarized antenna array of the first WCD 702 to improve the calibration accuracy over time. In some aspects, the first WCD 702 may transmit the request for calibration assistance in a case in which the capability information indicates that the calibration is an online calibration or a mixed-mode calibration. In some aspects, the first WCD 702 may not transmit the request for calibration assistance in a case in which the capability information indicates that the calibration is an offline calibration.

In some aspects, the first WCD 702 may transmit both the request for calibration assistance and the indication of the performance loss relative to the optimal beam correspondence to the second WCD 704. For example, the first WCD 702 may transmit the request for calibration assistance and the indication of the performance loss relative to the optimal beam correspondence to the second WCD 704 in the same communication (e.g., the indication of the performance loss relative to the optimal beam correspondence may be included in the request for calibration assistance) or in different communications. In some aspects, the first WCD 702 may transmit the request for calibration assistance, and the first WCD 702 may not transmit the indication of the performance loss relative to the optimal beam correspondence. In some aspects, the first WCD 702 may transmit the indication of the performance loss relative to the optimal beam correspondence, and the first WCD 702 may not transmit the request for calibration assistance. In some aspects, the first WCD 702 may transmit the request for calibration assistance (e.g., with or without the indication of the performance loss relative to optimal beam correspondence) based at least in part on a determination that the performance loss relative to optimal beam correspondence satisfies (e.g., is greater than or equal to) a threshold.

As further shown in FIG. 8, and by reference number 820, in some aspects, the second WCD 704 may transmit, and the first WCD 702 may receive, calibration assistance information. In some aspects, the calibration assistance information may indicate resources associated with one or more reference signals to be used to perform the calibration (e.g., for an online or mixed-mode calibration). For example, the reference signals may include downlink reference signals (e.g., channel state information (CSI) reference signals (CSI-RSs)) and/or uplink reference signals (e.g., sounding reference signals (SRSs)) to be used to perform the calibration. The reference signals may be used to perform measurements used for the calibration and/or to improve the calibration accuracy over time. In some examples in which the first WCD 702 is a UE and the second WCD 704 is a network node, the calibration assistance information may indicate resources associated with one or more downlink reference signals (e.g., CSI-RSs) to be received using the non-co-located dual-polarized antenna array of the first WCD 702 and/or one or more uplink reference signals (e.g., SRSs) to be transmitted using the non-co-located dual-polarized antenna array of the first WCD 702 for the online or mixed-mode calibration of the non-co-located dual-polarized antenna array of the first WCD 702.

In some aspects, the calibration information may be associated with the type of calibration indicated in the capability information. For example, the calibration information may indicate resources for reference signals to be used for an online calibration or a mixed-mode calibration. In some examples, the calibration information may indicate resources for reference signals to be used for an indicated type of online and/or mixed-mode calibration (e.g., separate calibration, common calibration, or full-duplexed calibration, among other examples). In some aspects, the second WCD 704 may transmit the calibration information to the first WCD 702 based at least in part on the type of calibration indicated in the capability information predicating that the calibration is an online calibration or a mixed offline and online calibration.

In some aspects, the second WCD 704 may transmit the calibration assistance information to the first WCD 702 based at least in part on the second WCD 704 receiving the request for calibration assistance information from the first WCD 702.

In some aspects, the second WCD 704 may transmit the calibration assistance information to the first WCD 702 based at least in part on the indication of the performance loss relative to the optimal beam correspondence. In some examples, the second WCD 704 may receive, from the first WCD 702, the indication of the performance loss relative to the optimal beam correspondence, and the second WCD 704 may determine whether to transmit the calibration assistance information based at least in part on a determination of whether the performance loss relative to the optimal beam correspondence satisfies (e.g., is greater than or equal to) a threshold. In such examples, the second WCD 704 may transmit the calibration assistance information to the first WCD 702 based at least in part on the performance loss relative to the optimal beam correspondence satisfying the threshold. In some other example, the first WCD 702 may transmit the indication of the performance loss relative to the optimal beam correspondence to the second WCD 704 based at least in part on a determination that the performance loss relative to the optimal beam correspondence satisfies (e.g., is greater than or equal to) a threshold, and the second WCD 704 may transmit the calibration assistance information to the first WCD 702 based at least in part on receiving the indication of the performance loss relative to the optimal beam correspondence from the first WCD 702.

In some aspects, the second WCD 704 may transmit the calibration assistance information to the first WCD 702 based at least in part on receiving the request for calibration assistance and based at least in part on the performance loss relative to the optimal beam correspondence satisfying a threshold. In some examples, the second WCD 704 may receive, from the first WCD 702, the request for calibration assistance and the indication of the performance loss relative to the optimal beam correspondence, and the second WCD 704 may transmit the calibration assistance information to the first WCD 702 in connection with receiving the request for calibration assistance and determining that the performance loss relative to the optimal beam correspondence satisfies the threshold. In some other examples, the first WCD 702 may transmit the request for calibration assistance to the second WCD 704 based at least in part on a determination that the performance loss relative to the optimal beam correspondence satisfies the threshold, and the second WCD 704 may transmit the calibration assistance information to the first WCD 702 in connection with receiving the request for calibration assistance from the first WCD 702.

As further shown in FIG. 8, and by reference number 825, in some aspects, the first WCD 702 may perform online or mixed-mode calibration of the non-co-located dual-polarized antenna array of the first WCD 702. In some aspects, in a case in which the capability information indicates that the calibration is an online calibration or a mixed-mode (e.g., mixed offline and online) calibration, the first WCD 702 may perform at least a portion of the calibration associated with the non-co-located dual-polarized antenna array (e.g., the online calibration or mixed-mode calibration) based at least in part on the calibration assistance information received from the second WCD 704. For example, the calibration assistance information may indicate resources associated with one or more reference signals (e.g., downlink and/or uplink reference signals), and the first WCD 702 may perform at least a portion of the calibration of the non-co-located dual-polarized antenna array based at least in part on the one or more reference signals. The calibration (or the portion of the calibration) of the non-co-located dual-polarized antenna array may determine beam correspondences between Tx and Rx beams (e.g., uplink-downlink beam correspondences). For example, the calibration (or the portion of the calibration) may determine correspondences between beam weights for Rx beams and Tx beams for all or a subset of beam directions. In some example, the calibration may be an on-demand calibration performed by the first WCD 702 for a particular beam direction.

In some aspects, the second WCD 704 may transmit one or more reference signals to the first WCD 702 in the resources indicated in the calibration assistance information, and the first WCD 702 may perform the calibration (e.g., or a portion of the calibration) based at least in part on measurements of the one or more reference signals transmitted by the second WCD 704. For example, in a case in which the first WCD 702 is a UE and the second WCD 704 is a network node, the second WCD 704 may transmit downlink reference signals (e.g., CSI-RSs) to the first WCD 702 in downlink reference signal reference indicated in the calibration assistance information, and the first WCD 702 may perform the calibration based at least in part on measurements of the downlink reference signals transmitted by the second WCD 704. Additionally, or alternatively, the first WCD 702 may transmit one or more reference signals to be used for the calibration of the non-co-located dual-polarized antenna array in resources indicated in the calibration assistance information. For example, in a case in which the first WCD 702 is a UE and the second WCD 704 is a network node, the first WCD 702 may transmit one or more uplink reference signals (e.g., SRSs) to be used to perform the calibration in uplink reference signal resources indicated in the calibration assistance information transmitted by the second WCD 704.

In some aspects, the first WCD 702 may perform separate calibration of the polarized arrays of the non-co-located dual-polarized antenna array. For example, the first WCD 702 may perform separate calibration of each polarized array (with the other polarized array inactive) based at least in part on reference signals received and/or transmitted by that polarized array.

In some aspects, the first WCD 702 may perform common calibration of the polarized arrays of the non-co-located dual-polarized antenna array. For example, the first WCD 702 may simultaneously calibrate the polarized arrays of the non-co-located dual-polarized antenna array based at least in part on reference signals received and/or transmitted by the polarized arrays of the non-co-located dual-polarized antenna array. In some aspects, phase and/or gain state setting determined using the common calibration of the polarized arrays may be adjusted in accordance with a look-up table (e.g., based at least in part on an inter-panel separation and/or an angle of steered beam, among other examples).

In some aspects, the first WCD 702 may perform full-duplexed calibration of the polarized arrays for the non-co-located dual-polarized antenna array. For example, a first polarized array may transmit one or more reference signals, a reflector may reflect the one or more reference signals and change the polarization of the one or more reference signals, and a second polarized array may receive the one or more reference signals and measure the signal strength of the received one or more reference signals. Additionally, or alternatively, the second polarized array may transmit one or more reference signals, the reflector may reflect the one or more reference signals and change the polarization of the one or more reference signals, and the first polarized array may receive the one or more reference signals and measure the signal strength of the received one or more reference signals. The first WCD 702 may calibrate the non-co-located dual-polarized antenna array based at least in part on the signal strength measurements of the reference signals received by the first and second polarized arrays.

As further shown in FIG. 8, and by reference number 830, the first WCD 702 and the second WCD 704 may communicate based at least in part on the calibration associated with the non-co-located dual-polarized antenna array of the first WCD 702. For example, the first WCD 702 may receive, via one or more Rx beams, one or more communications transmitted by the second WCD 704, and/or the first WCD 702 may transmit, via one or more Tx beams, one or more communications to the second WCD 704. The first WCD 702 may perform beamforming associated with the one or more Rx beams and/or the one or more Tx beams based at least in part on the beam correspondences determined in the calibration of the non-co-located dual-polarized antenna array of the first WCD 702. In some aspects, the first WCD 702 may determine the beam weights for a Tx beam by adjusting the beam weights for a corresponding Rx beam based at least in part on the beam correspondences determined in the calibration.

In some aspects, the calibration may be an online calibration or mixed-mode (e.g., mixed offline and online) calibration performed (at least partially) in mission-mode operations, as discussed in connection with reference number 825. In some other aspects, the calibration may be a previously-performed offline calibration.

As indicated above, FIG. 8 is provided as an example. Other examples may differ from what is described with respect to FIG. 8.

FIG. 9 is a diagram illustrating an example process 900 performed, for example, by a first wireless communication device, in accordance with the present disclosure. Example process 900 is an example where the first wireless communication device (e.g., first wireless communication device 702) performs operations associated with calibration of non-co-located polarized antenna arrays.

As shown in FIG. 9, in some aspects, process 900 may include transmitting, to a second wireless communication device, capability information including an indication of a type of calibration associated with a non-co-located dual-polarized antenna array of the first wireless communication device (block 910). For example, the first wireless communication device (e.g., using transmission component 1104 and/or communication manager 1106, depicted in FIG. 11) may transmit, to a second wireless communication device, capability information including an indication of a type of calibration associated with a non-co-located dual-polarized antenna array of the first wireless communication device, as described above, for example in connection with reference number 805 of FIG. 8.

As further shown in FIG. 9, in some aspects, process 900 may include communicating, using the non-co-located dual polarized antenna array, based at least in part on the calibration associated with the non-co-located dual polarized antenna array (block 920). For example, the first wireless communication device (e.g., using reception component 1102, transmission component 1104, and/or communication manager 1106, depicted in FIG. 11) may communicate, using the non-co-located dual polarized antenna array, based at least in part on the calibration associated with the non-co-located dual polarized antenna array, as described above, for example in connection with reference number 830 of FIG. 8.

Process 900 may include additional aspects, such as any single aspect or any combination of aspects described below and/or in connection with one or more other processes described elsewhere herein.

In a first aspect, the capability information further includes an indication that the first wireless communication device includes the non-co-located dual-polarized antenna array.

In a second aspect, alone or in combination with the first aspect, the indication of the type of the calibration indicates that the calibration is an offline calibration that has already been performed, an online calibration to be performed in mission-mode operations, or a mixed offline and online calibration.

In a third aspect, alone or in combination with one or more of the first and second aspects, the indication of the type of the calibration indicates that the calibration is a separate calibration of polarized arrays of the non-co-located dual-polarized antenna array, a common calibration of the polarized arrays of the non-co-located dual-polarized antenna array, or a full-duplexed calibration of the polarized arrays of the non-co-located dual-polarized array.

In a fourth aspect, alone or in combination with one or more of the first through third aspects, process 900 includes transmitting, to the second wireless communication device, an indication of a performance loss relative to an optimal beam correspondence associated with the calibration.

In a fifth aspect, alone or in combination with one or more of the first through fourth aspects, process 900 includes receiving, from the second wireless communication device, calibration assistance information associated with the type of the calibration indicated by the indication.

In a sixth aspect, alone or in combination with one or more of the first through fifth aspects, process 900 includes performing at least a portion of the calibration associated with the non-co-located dual polarized antenna array based at least in part on the calibration assistance information.

In a seventh aspect, alone or in combination with one or more of the first through sixth aspects, the calibration assistance information indicates resources associated with one or more reference signals to be used to perform the calibration.

In an eighth aspect, alone or in combination with one or more of the first through seventh aspects, process 900 includes performing at least a portion of the calibration associated with the non-co-located dual polarized antenna array based at least in part on the one or more reference signals.

In a ninth aspect, alone or in combination with one or more of the first through eighth aspects, receiving the calibration assistance information includes receiving the calibration assistance information based at least in part on the indication of the type of the calibration predicating that the calibration is an online calibration or a mixed offline and online calibration.

In a tenth aspect, alone or in combination with one or more of the first through ninth aspects, process 900 includes transmitting, to the second wireless communication device, a request for calibration assistance, wherein receiving the calibration assistance information includes receiving the calibration assistance information based at least in part on the request for calibration assistance.

In an eleventh aspect, alone or in combination with one or more of the first through tenth aspects, process 900 includes transmitting, to the second wireless communication device, an indication of a performance loss relative to an optimal beam correspondence associated with the calibration, wherein receiving the calibration assistance information includes receiving the calibration assistance information based at least in part on the indication of the performance loss relative to the optimal beam correspondence associated with the calibration satisfying a threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a second wireless communication device, in accordance with the present disclosure. Example process 1000 is an example where the second wireless communication device (e.g., second wireless communication device 704) performs operations associated with calibration of non-co-located polarized antenna arrays.

As shown in FIG. 10, in some aspects, process 1000 may include receiving, from a first wireless communication device, capability information including an indication of a type of calibration associated with a non-co-located dual-polarized antenna array of the first wireless communication device (block 1010). For example, the second wireless communication device (e.g., using reception component 1202 and/or communication manager 1206, depicted in FIG. 12) may receive, from a first wireless communication device, capability information including an indication of a type of calibration associated with a non-co-located dual-polarized antenna array of the first wireless communication device, as described above, for example in connection with reference number 805 of FIG. 8.

As further shown in FIG. 10, in some aspects, process 1000 may include communicating with the first wireless communication based at least in part on the calibration associated with the non-co-located dual polarized antenna array of the first wireless communication device (block 1020). For example, the second wireless communication device (e.g., using reception component 1202, transmission component 1204, and/or communication manager 1206, depicted in FIG. 12) may communicate with the first wireless communication based at least in part on the calibration associated with the non-co-located dual polarized antenna array of the first wireless communication device, as described above, for example in connection with reference number 830 of FIG. 8.

Process 1000 may include additional aspects, such as any single aspect or any combination of aspects described below and/or in connection with one or more other processes described elsewhere herein.

In a first aspect, the capability information further includes an indication that the first wireless communication device includes the non-co-located dual-polarized antenna array.

In a second aspect, alone or in combination with the first aspect, the indication of the type of the calibration indicates that the calibration is an offline calibration that has already been performed, an online calibration to be performed in mission-mode operations, or a mixed offline and online calibration.

In a third aspect, alone or in combination with one or more of the first and second aspects, the indication of the type of the calibration indicates that the calibration is a separate calibration of polarized arrays of the non-co-located dual-polarized antenna array, a common calibration of the polarized arrays of the non-co-located dual-polarized antenna array, or a full-duplexed calibration of the polarized arrays of the non-co-located dual-polarized antenna array.

In a fourth aspect, alone or in combination with one or more of the first through third aspects, process 1000 includes receiving, from the first wireless communication device, an indication of a performance loss relative to an optimal beam correspondence associated with the calibration.

In a fifth aspect, alone or in combination with one or more of the first through fourth aspects, process 1000 includes transmitting, to the first wireless communication device, calibration assistance information associated with the type of the calibration indicated by the indication.

In a sixth aspect, alone or in combination with one or more of the first through fifth aspects, the calibration assistance information indicates resources associated with one or more reference signals to be used to perform the calibration.

In a seventh aspect, alone or in combination with one or more of the first through sixth aspects, transmitting the calibration assistance information includes transmitting the calibration assistance information based at least in part on the indication of the type of the calibration predicating that the calibration is an online calibration or a mixed offline and online calibration.

In an eighth aspect, alone or in combination with one or more of the first through seventh aspects, process 1000 includes receiving, from the first wireless communication device, a request for calibration assistance, wherein transmitting the calibration assistance information includes transmitting the calibration assistance information based at least in part on the request for calibration assistance.

In a ninth aspect, alone or in combination with one or more of the first through eighth aspects, process 1000 includes receiving, from the first wireless communication device, an indication of a performance loss relative to an optimal beam correspondence associated with the calibration, wherein transmitting the calibration assistance information includes transmitting the calibration assistance information based at least in part on the indication of the performance loss relative to the optimal beam correspondence associated with the calibration satisfying a threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
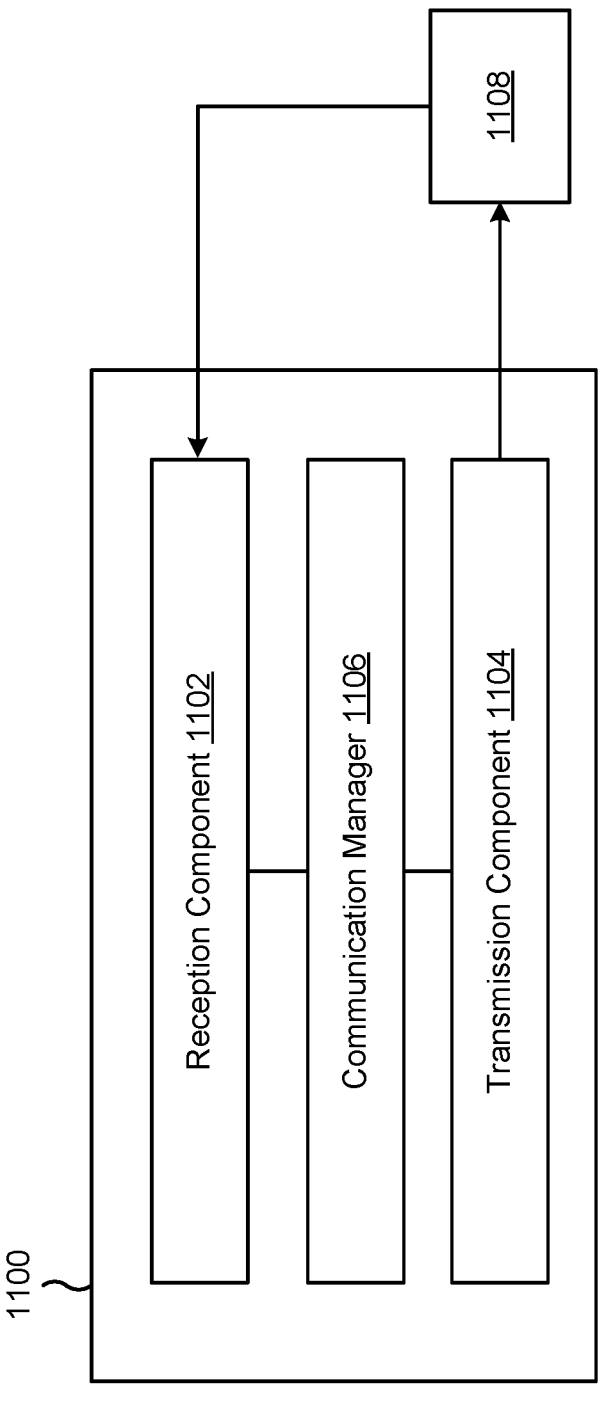
FIGS. 11-12 are diagrams of example apparatuses for wireless communication, in accordance with the present disclosure.

FIG. 11 is a diagram of an example apparatus 1100 for wireless communication, in accordance with the present disclosure. The apparatus 1100 may be a first wireless communication device (e.g., a UE 120 or a network node 110), or a first wireless communication device may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 or the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of a wireless communication device (e.g., the UE 120 or the network node 110) described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the first wireless communication device described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the first wireless communication device described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit, to a second wireless communication device, capability information including an indication of a type of calibration associated with a non-co-located dual-polarized antenna array of the first wireless communication device. The reception component 1102 and/or the transmission component 1104 may communicate, using the non-co-located dual polarized antenna array, based at least in part on the calibration associated with the non-co-located dual polarized antenna array.

The transmission component 1104 may transmit, to the second wireless communication device, an indication of a performance loss relative to an optimal beam correspondence associated with the calibration.

The reception component 1102 may receive, from the second wireless communication device, calibration assistance information associated with the type of the calibration indicated by the indication.

The communication manager 1106 may perform at least a portion of the calibration associated with the non-co-located dual polarized antenna array based at least in part on the calibration assistance information.

The communication manager 1106 may perform at least a portion of the calibration associated with the non-co-located dual polarized antenna array based at least in part on the one or more reference signals.

The transmission component 1104 may transmit, to the second wireless communication device, a request for calibration assistance, wherein receiving the calibration assistance information comprises receiving the calibration assistance information based at least in part on the request for calibration assistance.

The transmission component 1104 may transmit, to the second wireless communication device, an indication of a performance loss relative to an optimal beam correspondence associated with the calibration, wherein receiving the calibration assistance information comprises receiving the calibration assistance information based at least in part on the indication of the performance loss relative to the optimal beam correspondence associated with the calibration satisfying a threshold.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
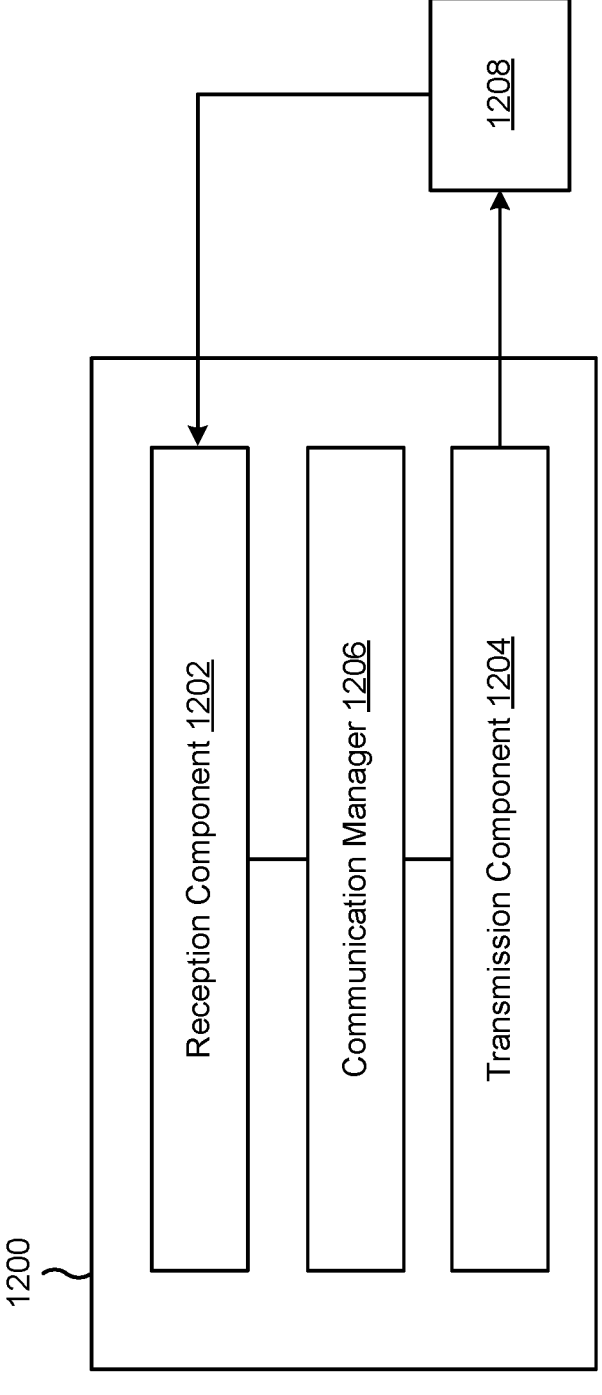

FIG. 12 is a diagram of an example apparatus 1200 for wireless communication, in accordance with the present disclosure. The apparatus 1200 may be a second wireless communication device (e.g., a network node 110 or a UE 120), or a second wireless communication device may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 or the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of a wireless communication device (e.g., the network node 110 or the UE 120) described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the second wireless communication device described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the second wireless communication device described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive, from a first wireless communication device, capability information including an indication of a type of calibration associated with a non-co-located dual-polarized antenna array of the first wireless communication device. The reception component 1202 and/or the transmission component 1204 may communicate with the first wireless communication based at least in part on the calibration associated with the non-co-located dual polarized antenna array of the first wireless communication device.

The reception component 1202 may receive, from the first wireless communication device, an indication of a performance loss relative to an optimal beam correspondence associated with the calibration.

The transmission component 1204 may transmit, to the first wireless communication device, calibration assistance information associated with the type of the calibration indicated by the indication.

The reception component 1202 may receive, from the first wireless communication device, a request for calibration assistance, wherein transmitting the calibration assistance information comprises transmitting the calibration assistance information based at least in part on the request for calibration assistance.

The reception component 1202 may receive, from the first wireless communication device, an indication of a performance loss relative to an optimal beam correspondence associated with the calibration, wherein transmitting the calibration assistance information comprises transmitting the calibration assistance information based at least in part on the indication of the performance loss relative to the optimal beam correspondence associated with the calibration satisfying a threshold.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first wireless communication device, comprising: transmitting, to a second wireless communication device, capability information including an indication of a type of calibration associated with a non-co-located dual-polarized antenna array of the first wireless communication device; and communicating, using the non-co-located dual polarized antenna array, based at least in part on the calibration associated with the non-co-located dual polarized antenna array.

Aspect 2: The method of Aspect 1, wherein the capability information further includes an indication that the first wireless communication device includes the non-co-located dual-polarized antenna array.

Aspect 3: The method of any of Aspects 1-2, wherein the indication of the type of the calibration indicates that the calibration is an offline calibration that has already been performed, an online calibration to be performed in mission-mode operations, or a mixed offline and online calibration.

Aspect 4: The method of any of Aspects 1-3, wherein the indication of the type of the calibration indicates that the calibration is a separate calibration of polarized arrays of the non-co-located dual-polarized antenna array, a common calibration of the polarized arrays of the non-co-located dual-polarized antenna array, or a full-duplexed calibration of the polarized arrays of the non-co-located dual-polarized array.

Aspect 5: The method of any of Aspects 1-4, further comprising: transmitting, to the second wireless communication device, an indication of a performance loss relative to an optimal beam correspondence associated with the calibration.

Aspect 6: The method of any of Aspects 1-5, further comprising: receiving, from the second wireless communication device, calibration assistance information associated with the type of the calibration indicated by the indication.

Aspect 7: The method of Aspect 6, further comprising: performing at least a portion of the calibration associated with the non-co-located dual polarized antenna array based at least in part on the calibration assistance information.

Aspect 8: The method of any of Aspects 6-7, wherein the calibration assistance information indicates resources associated with one or more reference signals to be used to perform the calibration.

Aspect 9: The method of Aspect 8, further comprising: performing at least a portion of the calibration associated with the non-co-located dual polarized antenna array based at least in part on the one or more reference signals.

Aspect 10: The method of any of Aspects 6-9, wherein receiving the calibration assistance information comprises: receiving the calibration assistance information based at least in part on the indication of the type of the calibration predicating that the calibration is an online calibration or a mixed offline and online calibration.

Aspect 11: The method of any of Aspects 6-10, further comprising: transmitting, to the second wireless communication device, a request for calibration assistance, wherein receiving the calibration assistance information comprises receiving the calibration assistance information based at least in part on the request for calibration assistance.

Aspect 12: The method of any of Aspects 6-11, further comprising: transmitting, to the second wireless communication device, an indication of a performance loss relative to an optimal beam correspondence associated with the calibration, wherein receiving the calibration assistance information comprises receiving the calibration assistance information based at least in part on the indication of the performance loss relative to the optimal beam correspondence associated with the calibration satisfying a threshold.

Aspect 13: A method of wireless communication performed by a second wireless communication device, comprising: receiving, from a first wireless communication device, capability information including an indication of a type of calibration associated with a non-co-located dual-polarized antenna array of the first wireless communication device; and communicating with the first wireless communication based at least in part on the calibration associated with the non-co-located dual polarized antenna array of the first wireless communication device.

Aspect 14: The method of Aspect 13, wherein the capability information further includes an indication that the first wireless communication device includes the non-co-located dual-polarized antenna array.

Aspect 15: The method of any of Aspects 13-14, wherein the indication of the type of the calibration indicates that the calibration is an offline calibration that has already been performed, an online calibration to be performed in mission-mode operations, or a mixed offline and online calibration.

Aspect 16: The method of any of Aspects 13-15, wherein the indication of the type of the calibration indicates that the calibration is a separate calibration of polarized arrays of the non-co-located dual-polarized antenna array, a common calibration of the polarized arrays of the non-co-located dual-polarized antenna array, or a full-duplexed calibration of the polarized arrays of the non-co-located dual-polarized antenna array.

Aspect 17: The method of any of Aspects 13-16, further comprising: receiving, from the first wireless communication device, an indication of a performance loss relative to an optimal beam correspondence associated with the calibration.

Aspect 18: The method of any of Aspects 13-17, further comprising: transmitting, to the first wireless communication device, calibration assistance information associated with the type of the calibration indicated by the indication.

Aspect 19: The method of Aspect 18, wherein the calibration assistance information indicates resources associated with one or more reference signals to be used to perform the calibration.

Aspect 20: The method of any of Aspects 18-19, wherein transmitting the calibration assistance information comprises: transmitting the calibration assistance information based at least in part on the indication of the type of the calibration predicating that the calibration is an online calibration or a mixed offline and online calibration.

Aspect 21: The method of any of Aspects 18-20, further comprising: receiving, from the first wireless communication device, a request for calibration assistance, wherein transmitting the calibration assistance information comprises transmitting the calibration assistance information based at least in part on the request for calibration assistance.

Aspect 22: The method of any of Aspects 18-21, further comprising: receiving, from the first wireless communication device, an indication of a performance loss relative to an optimal beam correspondence associated with the calibration, wherein transmitting the calibration assistance information comprises transmitting the calibration assistance information based at least in part on the indication of the performance loss relative to the optimal beam correspondence associated with the calibration satisfying a threshold.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device for wireless communication, comprising:
    one or more memories; and
    one or more processors, coupled to the one or more memories, configured to:
        transmit, to a second wireless communication device, capability information including an indication of a type of calibration associated with a non-co-located dual-polarized antenna array of the first wireless communication device, the non-co-located dual-polarized antenna array including a first polarized array having a first polarization and a second polarized array having a second polarization different than the first polarization; and
        communicate, using the non-co-located dual-polarized antenna array, based at least in part on the calibration associated with the non-co-located dual-polarized antenna array.

2. The first wireless communication device of claim 1, wherein the capability information further includes an indication that the first wireless communication device includes the non-co-located dual-polarized antenna array.

3. The first wireless communication device of claim 1, wherein the indication of the type of the calibration indicates that the calibration is an offline calibration that has already been performed, an online calibration to be performed in mission-mode operations, or a mixed offline and online calibration.

4. The first wireless communication device of claim 1, wherein the indication of the type of the calibration indicates that the calibration is a separate calibration of polarized arrays of the non-co-located dual-polarized antenna array, a common calibration of the polarized arrays of the non-co-located dual-polarized antenna array, or a full-duplexed calibration of the polarized arrays of the non-co-located dual-polarized array.

5. The first wireless communication device of claim 1, wherein the one or more processors are further configured to:
    transmit, to the second wireless communication device, an indication of a performance loss relative to an optimal beam correspondence associated with the calibration.

6. The first wireless communication device of claim 1, wherein the one or more processors are further configured to:
    receive, from the second wireless communication device, calibration assistance information associated with the type of the calibration indicated by the indication.

7. The first wireless communication device of claim 6, wherein the one or more processors are further configured to:
    perform at least a portion of the calibration associated with the non-co-located dual-polarized antenna array based at least in part on the calibration assistance information.

8. The first wireless communication device of claim 6, wherein the calibration assistance information indicates resources associated with one or more reference signals to be used to perform the calibration.

9. The first wireless communication device of claim 8, wherein the one or more processors are further configured to:
    perform at least a portion of the calibration associated with the non-co-located dual-polarized antenna array based at least in part on the one or more reference signals.

10. The first wireless communication device of claim 6, wherein the one or more processors, to receive the calibration assistance information, are configured to:
    receive the calibration assistance information based at least in part on the indication of the type of the calibration predicating that the calibration is an online calibration or a mixed offline and online calibration.

11. The first wireless communication device of claim 6, wherein the one or more processors are further configured to:
    transmit, to the second wireless communication device, a request for calibration assistance, wherein receiving the calibration assistance information comprises receiving the calibration assistance information based at least in part on the request for calibration assistance.

12. The first wireless communication device of claim 6, wherein the one or more processors are further configured to:

transmit, to the second wireless communication device, an indication of a performance loss relative to an optimal beam correspondence associated with the calibration, wherein receiving the calibration assistance information comprises receiving the calibration assistance information based at least in part on the indication of the performance loss relative to the optimal beam correspondence associated with the calibration satisfying a threshold.

13. A second wireless communication device for wireless communication, comprising:

one or more memories; and one or more processors, coupled to the one or more memories, configured to:

receive, from a first wireless communication device, capability information including an indication of a type of calibration associated with a non-co-located dual-polarized antenna array of the first wireless communication device, the non-co-located dual-polarized antenna array including a first polarized array having a first polarization and a second polarized array having a second polarization different than the first polarization; and communicate with the first wireless communication based at least in part on the calibration associated with the non-co-located dual-polarized antenna array of the first wireless communication device.

14. The second wireless communication device of claim 13, wherein the capability information further includes an indication that the first wireless communication device includes the non-co-located dual-polarized antenna array.

15. The second wireless communication device of claim 13, wherein the indication of the type of the calibration indicates that the calibration is an offline calibration that has already been performed, an online calibration to be performed in mission-mode operations, or a mixed offline and online calibration.

16. The second wireless communication device of claim 13, wherein the indication of the type of the calibration indicates that the calibration is a separate calibration of polarized arrays of the non-co-located dual-polarized antenna array, a common calibration of the polarized arrays of the non-co-located dual-polarized antenna array, or a full-duplexed calibration of the polarized arrays of the non-co-located dual-polarized antenna array.

17. The second wireless communication device of claim 13, wherein the one or more processors are further configured to:

receive, from the first wireless communication device, an indication of a performance loss relative to an optimal beam correspondence associated with the calibration.

18. The second wireless communication device of claim 13, wherein the one or more processors are further configured to:

transmit, to the first wireless communication device, calibration assistance information associated with the type of the calibration indicated by the indication.

19. The second wireless communication device of claim 18, wherein the calibration assistance information indicates resources associated with one or more reference signals to be used to perform the calibration.

20. The second wireless communication device of claim 18, wherein the one or more processors, to transmit the calibration assistance information, are configured to:

transmit the calibration assistance information based at least in part on the indication of the type of the calibration predicating that the calibration is an online calibration or a mixed offline and online calibration.

21. The second wireless communication device of claim 18, wherein the one or more processors are further configured to:

receive, from the first wireless communication device, a request for calibration assistance, wherein transmitting the calibration assistance information comprises transmitting the calibration assistance information based at least in part on the request for calibration assistance.

22. The second wireless communication device of claim 18, wherein the one or more processors are further configured to:

receive, from the first wireless communication device, an indication of a performance loss relative to an optimal beam correspondence associated with the calibration, wherein transmitting the calibration assistance information comprises transmitting the calibration assistance information based at least in part on the indication of the performance loss relative to the optimal beam correspondence associated with the calibration satisfying a threshold.

23. A method of wireless communication performed by a first wireless communication device, comprising:

transmitting, to a second wireless communication device, capability information including an indication of a type of calibration associated with a non-co-located dual-polarized antenna array of the first wireless communication device, the non-co-located dual-polarized antenna array including a first polarized array having a first polarization and a second polarized array having a second polarization different than the first polarization; and communicating, using the non-co-located dual-polarized antenna array, based at least in part on the calibration associated with the non-co-located dual-polarized antenna array.

24. The method of claim 23, wherein the indication of the type of the calibration indicates that the calibration is an offline calibration that has already been performed, an online calibration to be performed in mission-mode operations, or a mixed offline and online calibration.

25. The method of claim 23, wherein the indication of the type of the calibration indicates that the calibration is a separate calibration of polarized arrays of the non-co-located dual-polarized antenna array, a common calibration of the polarized arrays of the non-co-located dual-polarized antenna array, or a full-duplexed calibration of the polarized arrays of the non-co-located dual-polarized array.

26. The method of claim 23, further comprising:

transmitting, to the second wireless communication device, an indication of a performance loss relative to an optimal beam correspondence associated with the calibration.

27. The method of claim 23, further comprising:

receiving, from the second wireless communication device, calibration assistance information associated with the type of the calibration indicated by the indication; and performing at least a portion of the calibration associated with the non-co-located dual-polarized antenna array based at least in part on the calibration assistance information.

28. The method of claim 27, wherein the calibration assistance information indicates resources associated with one or more reference signals to be used to perform the calibration.

29. The method of claim 27, further comprising:

transmitting, to the second wireless communication device, a request for calibration assistance, wherein receiving the calibration assistance information comprises receiving the calibration assistance information based at least in part on the request for calibration assistance.

30. A method of wireless communication performed by a second wireless communication device, comprising:

receiving, from a first wireless communication device, capability information including an indication of a type of calibration associated with a non-co-located dual-polarized antenna array of the first wireless communication device, the non-co-located dual-polarized antenna array including a first polarized array having a first polarization and a second polarized array having a second polarization different than the first polarization; and communicating with the first wireless communication based at least in part on the calibration associated with the non-co-located dual-polarized antenna array of the first wireless communication device.

\* \* \* \* \*